(12) United States Patent
Hirano et al.

(10) Patent No.: US 12,130,488 B2
(45) Date of Patent: Oct. 29, 2024

(54) OPTICAL FIBER

(71) Applicants: TATSUTA ELECTRIC WIRE & CABLE CO., LTD., Osaka (JP); MARUYAMA FROSTING CO., LTD., Hyogo (JP)

(72) Inventors: Hideyuki Hirano, Kyoto (JP); Keiichiro Hirose, Kyoto (JP); Syoji Nakazono, Kyoto (JP); Akihiko Koyama, Kyoto (JP); Takaya Konishi, Hyogo (JP); Ai Takahashi, Hyogo (JP); Masakatsu Setoguchi, Hyogo (JP)

(73) Assignees: TATSUTA ELECTRIC WIRE & CABLE CO., LTD., Osaka (JP); MARUYAMA FROSTING CO., LTD., Hyogo (JP)

( * ) Notice: Subject to any disclaimer, the term of this patent is extended or adjusted under 35 U.S.C. 154(b) by 278 days.

(21) Appl. No.: 17/624,982

(22) PCT Filed: Aug. 28, 2020

(86) PCT No.: PCT/JP2020/032594
§ 371 (c)(1),
(2) Date: Jan. 5, 2022

(87) PCT Pub. No.: WO2021/039962
PCT Pub. Date: Mar. 4, 2021

(65) Prior Publication Data
US 2022/0291472 A1    Sep. 15, 2022

(30) Foreign Application Priority Data
Aug. 30, 2019 (JP) ................................ 2019-158712

(51) Int. Cl.
*G02B 6/44* (2006.01)
*G02B 6/02* (2006.01)

(52) U.S. Cl.
CPC ....... *G02B 6/4479* (2013.01); *G02B 6/02004* (2013.01)

(58) Field of Classification Search
CPC .......................... G02B 6/4479; G02B 6/02004
(Continued)

(56) References Cited

U.S. PATENT DOCUMENTS

| 4,285,889 A | 8/1981 | Parsons |
| 5,432,876 A | 7/1995 | Appeldorn et al. |

(Continued)

FOREIGN PATENT DOCUMENTS

| DE | 102005014903 A1 | 10/2006 |
| JP | 48-68613 A | 9/1973 |

(Continued)

OTHER PUBLICATIONS

International Search Report (ISR) dated Sep. 24, 2020 filed in PCT/JP2020/032594.
(Continued)

*Primary Examiner* — Jerry M Blevins
(74) *Attorney, Agent, or Firm* — RANKIN, HILL & CLARK LLP

(57) ABSTRACT

An optical fiber (10) capable of minimizing strength deterioration includes a core (11) and a clad (12) arranged around the core (11) such that part of the core (11) is exposed. A rough surface portion is provided at least at part of an outer surface of the exposed portion (11a) of the core (11) exposed through the clad (12). The arithmetic surface roughness Ra of the rough surface portion is equal to or greater than 0.2 μm. The average length Rsm of a rough curve element of the rough surface portion is equal to or greater than 17 μm.

6 Claims, 23 Drawing Sheets

(58) Field of Classification Search
USPC .......................................................... 385/123
See application file for complete search history.

(56) References Cited

U.S. PATENT DOCUMENTS

| | | | |
|---|---|---|---|
| 5,737,472 A | | 4/1998 | Bernasson et al. |
| 6,004,315 A | * | 12/1999 | Dumont ................. G02B 6/245 |
| | | | 606/7 |
| 7,862,219 B2 | | 1/2011 | Mersch et al. |
| 10,222,518 B2 | | 3/2019 | Nonaka |
| 2007/0171654 A1 | | 7/2007 | Etori |
| 2008/0058908 A1 | * | 3/2008 | Bornstein ............ A61C 19/063 |
| | | | 607/93 |
| 2010/0097822 A1 | | 4/2010 | Mersch et al. |
| 2017/0160446 A1 | | 6/2017 | Nonaka |
| 2018/0113246 A1 | | 4/2018 | Rose et al. |
| 2019/0131921 A1 | | 5/2019 | Bae |

FOREIGN PATENT DOCUMENTS

| | | | | | |
|---|---|---|---|---|---|
| JP | 56-34837 U | | 4/1981 | | |
| JP | 58-7604 A | | 1/1983 | | |
| JP | 6-201917 A | | 7/1994 | | |
| JP | 7-290652 A | | 11/1995 | | |
| JP | 9-506716 A | | 6/1997 | | |
| JP | 10-133022 A | | 5/1998 | | |
| JP | 2012-506569 A | | 3/2012 | | |
| JP | 2013-29804 A | | 2/2013 | | |
| JP | 2017-24226 A | | 2/2017 | | |
| JP | 2017-107193 A | | 6/2017 | | |
| JP | 2019-51023 A | | 4/2019 | | |
| TW | I604238 B | * | 11/2017 | ............... | G02B 6/00 |

OTHER PUBLICATIONS

Japanese Office Action (JPOA) dated Jun. 15, 2023 for Japanese Patent Application No. 2021-543039; English machine translation.
Japanese Office Action (JPOA) dated Jan. 24, 2023 for Japanese Patent Application No. 2021-543039; English machine translation.
German Office Action (DEOA) dated Dec. 8, 2023 for German Patent Application No. 112020004027.5; Partial English Translation.

* cited by examiner

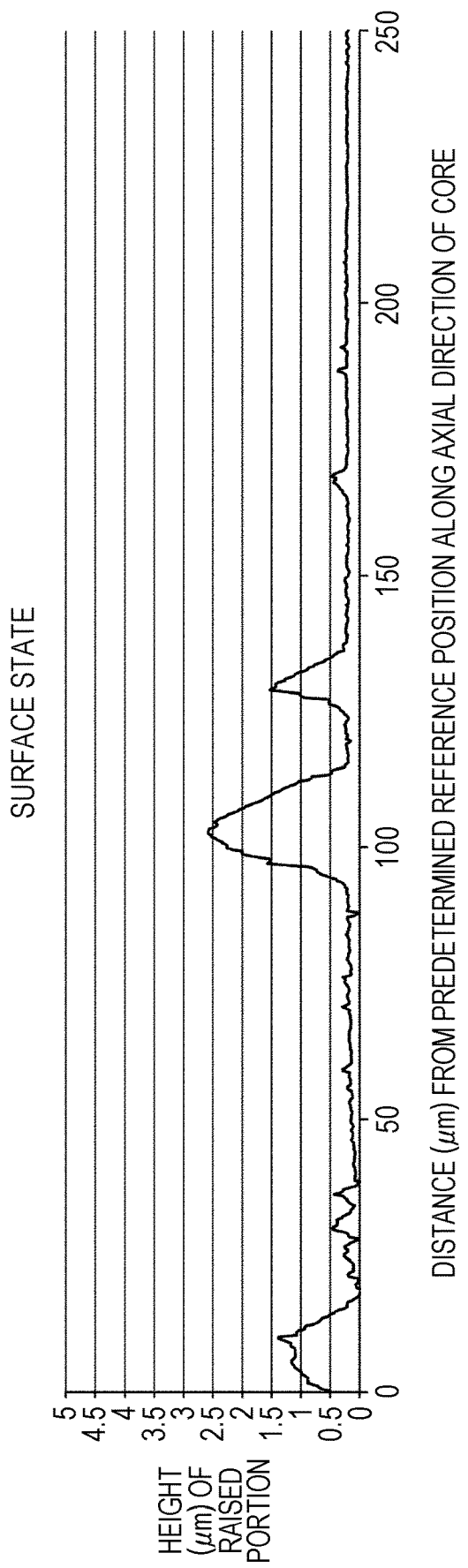

FIG. 4

| SAMPLE NAME | N | Ra (μm) | Rsk | Rku | RSm (μm) | Rzjis (μm) | Rmr 80% (%) |
|---|---|---|---|---|---|---|---|
| FIRST EXAMPLE ONE END SIDE (BASE SIDE) | N=1 | 0.55 | 1.52 | 5.15 | 54.14 | 2.23 | 40.59 |
| | N=2 | 0.62 | 1.28 | 3.78 | 53.81 | 2.52 | 52.31 |
| | N=3 | 0.69 | 1.28 | 3.64 | 53.73 | 2.67 | 44.29 |
| FIRST EXAMPLE OTHER END SIDE (TIP END SIDE) | N=1 | 0.72 | 1.16 | 3.84 | 45.79 | 2.70 | 49.26 |
| | N=2 | 0.80 | 0.68 | 2.42 | 43.58 | 2.85 | 56.10 |
| | N=3 | 0.76 | 0.98 | 3.29 | 46.80 | 2.83 | 50.16 |
| SECOND EXAMPLE ONE END SIDE (BASE SIDE) | N=1 | 0.31 | 2.38 | 9.10 | 38.48 | 1.86 | 29.13 |
| | N=2 | 0.29 | 2.51 | 9.62 | 39.60 | 1.74 | 35.65 |
| | N=3 | 0.29 | 2.92 | 13.43 | 41.48 | 1.64 | 28.25 |
| SECOND EXAMPLE OTHER END SIDE (TIP END SIDE) | N=1 | 0.37 | 2.15 | 7.43 | 44.05 | 1.86 | 30.26 |
| | N=2 | 0.37 | 2.16 | 7.85 | 47.01 | 1.85 | 35.75 |
| | N=3 | 0.34 | 2.12 | 7.68 | 39.79 | 1.88 | 41.88 |
| FIRST COMPARATIVE EXAMPLE | N=1 | 0.04 | 0.30 | 13.11 | 12.99 | 0.34 | 90.80 |
| | N=2 | 0.04 | 0.48 | 10.92 | 13.39 | 0.35 | 93.43 |
| FIRST REFERENCE EXAMPLE ONE END SIDE (BASE SIDE) | N=1 | 0.44 | -0.03 | 3.26 | 13.37 | 2.64 | 95.43 |
| | N=2 | 0.45 | -0.01 | 2.99 | 13.71 | 2.58 | 96.18 |
| | N=3 | 0.44 | 0.01 | 3.37 | 13.91 | 2.61 | 95.72 |
| FIRST REFERENCE EXAMPLE OTHER END SIDE (TIP END SIDE) | N=1 | 0.46 | 0.02 | 3.41 | 13.45 | 2.80 | 95.81 |
| | N=2 | 0.47 | -0.01 | 3.31 | 14.63 | 2.75 | 93.59 |
| | N=3 | 0.48 | 0.00 | 3.11 | 14.31 | 2.75 | 95.29 |

FIG. 13

| SAMPLE NAME | EVALUATION OF LIGHT EMITTED FROM TIP END ||| EVALUATION OF LIGHT EMITTED LATERALLY |||
|---|---|---|---|---|---|---|
| | RADIATION FLUX ($\mu$W) OF TIP END EMITTED LIGHT | OUTPUT ($\mu$W) OF LIGHT SOURCE | PROPORTION OF TIP END EMITTED LIGHT AS COMPARED TO OUTPUT OF LIGHT SOURCE | LATERAL MEASUREMENT POSITION | RADIATION FLUX ($\mu$W) OF LATERALLY-EMITTED LIGHT | RADIATION FLUX OF LATERALLY-EMITTED LIGHT / RADIATION FLUX OF TIP END EMITTED LIGHT (%) |
| FIRST COMPARATIVE EXAMPLE | 275 | 275 | 100% | ONE END (BASE) SIDE | 4.2 | 2% |
| | | | | CENTER SIDE | 3.6 | 1% |
| | | | | OTHER END (TIP END) SIDE | 2.7 | 1% |
| FIRST REFERENCE EXAMPLE | 122 | 275 | 44% | ONE END (BASE) SIDE | 19.5 | 16% |
| | | | | CENTER SIDE | 5.1 | 4% |
| | | | | OTHER END (TIP END) SIDE | 8.3 | 7% |
| FIRST EXAMPLE | 40 | 170 | 24% | ONE END (BASE) SIDE | 17.0 | 42% |
| | | | | CENTER SIDE | 16.4 | 41% |
| | | | | OTHER END (TIP END) SIDE | 9.6 | 24% |
| SECOND EXAMPLE | 45 | 126 | 36% | ONE END (BASE) SIDE | 5.1 | 11% |
| | | | | CENTER SIDE | 4.1 | 9% |
| | | | | OTHER END (TIP END) SIDE | 3.2 | 7% |

FIG. 18

ROUGHNESS MEASUREMENT

| SAMPLE NAME | IDENTIFICATION/ LOCATION | Ra | Rsk | Rku | Rsm | Rmr | Rzjis |
|---|---|---|---|---|---|---|---|
| THIRD EXAMPLE | TIP END | 0.31 | 1.12 | 2.75 | 18.00 | 100 | 1.12 |
| | CENTER | 0.25 | 1.78 | 4.68 | 18.78 | 100 | 1.10 |
| | BASE | 0.25 | 1.33 | 4.54 | 18.57 | 100 | 1.05 |
| FOURTH EXAMPLE | TIP END | 0.37 | 0.35 | 1.83 | 18.07 | 100 | 1.37 |
| | CENTER | 0.38 | 0.50 | 1.98 | 17.97 | 100 | 1.39 |
| | BASE | 0.38 | 0.42 | 1.94 | 18.63 | 100 | 1.34 |

FIG. 19

| SAMPLE NAME | EVALUATION OF LIGHT EMITTED FROM TIP END ||| EVALUATION OF LIGHT EMITTED LATERALLY |||
|---|---|---|---|---|---|---|
| | RADIATION FLUX (μW) OF TIP END EMITTED LIGHT | OUTPUT (μW) OF LIGHT SOURCE | PROPORTION OF TIP END EMITTED LIGHT AS COMPARED TO OUTPUT OF LIGHT SOURCE | LATERAL MEASUREMENT POSITION | RADIATION FLUX (μW) OF LATERALLY-EMITTED LIGHT | RADIATION FLUX OF LATERALLY-EMITTED LIGHT/ RADIATION FLUX OF TIP END EMITTED LIGHT (%) |
| SECOND COMPARATIVE EXAMPLE | 412 | 412 | 100% | ONE END (BASE) SIDE | 5.4 | 1% |
| | | | | CENTER SIDE | 1.3 | 0% |
| | | | | OTHER END (TIP END) SIDE | 2.6 | 1% |
| THIRD EXAMPLE | 104 | 412 | 25% | ONE END (BASE) SIDE | 27.7 | 27% |
| | | | | CENTER SIDE | 29.0 | 28% |
| | | | | OTHER END (TIP END) SIDE | 25.0 | 24% |

FIG. 22

| SAMPLE NAME | EVALUATION OF LIGHT EMITTED FROM TIP END ||| EVALUATION OF LIGHT EMITTED LATERALLY |||
|---|---|---|---|---|---|---|
| | RADIATION FLUX (μW) OF TIP END EMITTED LIGHT | OUTPUT (μW) OF LIGHT SOURCE | PROPORTION OF TIP END EMITTED LIGHT AS COMPARED TO OUTPUT OF LIGHT SOURCE | LATERAL MEASUREMENT POSITION | RADIATION FLUX (μW) OF LATERALLY-EMITTED LIGHT | RADIATION FLUX OF LATERALLY-EMITTED LIGHT / RADIATION FLUX OF TIP END EMITTED LIGHT (%) |
| THIRD COMPARATIVE EXAMPLE | 115 | 115 | 100% | ONE END (BASE) SIDE | 1.2 | 1% |
| | | | | CENTER SIDE | 0.8 | 1% |
| | | | | OTHER END (TIP END) SIDE | 1.4 | 1% |
| FOURTH EXAMPLE | 16 | 115 | 14% | ONE END (BASE) SIDE | 24.0 | 150% |
| | | | | CENTER SIDE | 11.0 | 69% |
| | | | | OTHER END (TIP END) SIDE | 3.5 | 22% |

OPTICAL FIBER

TECHNICAL FIELD

The present invention relates to an optical fiber. Specifically, the present invention relates to an optical fiber capable of laterally emitting light.

BACKGROUND ART

As conventional optical fibers, optical fibers capable of laterally emitting light are disclosed in JP-T-09-506716 (Patent Literature 1) and JP-A-58-7604 (Patent Literature 2).

At each of the optical fibers disclosed in Patent Literature 1 and Patent Literature 2, scratches are provided at a peripheral surface of the optical fiber by, e.g., a sandblasting method. Light transmitted in the optical fiber is scattered by these scratches. Accordingly, light can be emitted laterally to the optical fiber.

At each of the optical fibers disclosed in Patent Literature 1 and Patent Literature 2, the scratches are provided. Thus, the intensity of the optical fiber is deteriorated, and for this reason, the optical fiber is brittle.

As glass surface treatment different from the sandblasting method, glass surface frosting using frosting liquid is disclosed in JP-UM-A-56-034837 (Patent Literature 3) and JP-A-48-068613 (Patent Literature 4).

CITATION LIST

Patent Literature

PATENT LITERATURE 1: JP-T-09-506716
PATENT LITERATURE 2: JP-A-58-7604
PATENT LITERATURE 3: JP-UM-A-56-034837
PATENT LITERATURE 4: JP-A-48-068613

SUMMARY OF INVENTION

Problems to be Solved by Invention

The optical fiber is considerably thin. For this reason, depending on a use form, strength deterioration is preferably avoided in some cases. For reducing strength deterioration, the optical fiber is not processed by the sandblasting method, but is frosted in some cases. Even in these cases, there are concerns that sufficient light is not laterally emitted depending on a core surface state after frosting.

The present invention has been made in view of the above-described problems. That is, an object of the present invention is to provide an optical fiber capable of laterally emitting sufficient light.

Solution to Problems

The optical fiber according to the present disclosure includes a core and a clad arranged around the core such that part of the core is exposed. A rough surface portion is provided at least at part of an outer surface of the core exposed portion exposed through the clad. The arithmetic surface roughness Ra of the rough surface portion is equal to or greater than 0.2 μm. Moreover, the average length Rsm of a rough curve element of the rough surface portion is equal to or greater than 17 μm.

In the optical fiber according to the present disclosure, raised portions protruding from the outer surface of the exposed portion to the outside are preferably formed at the rough surface portion.

In the optical fiber according to the present disclosure, the skewness Rsk of the rough surface portion is preferably greater than 0.

In the optical fiber according to the present disclosure, the core preferably includes one end into which light enters from a light source and the other end positioned on the opposite side of the one end. In this case, at the rough surface portion, the arithmetic surface roughness Ra on one end side may be smaller than the arithmetic surface roughness Ra on the other end side.

In the optical fiber according to the present disclosure, the core preferably includes one end into which the light enters from the light source and the other end positioned on the opposite side of the one end. In this case, the exposed portion is preferably provided on the other end side of the core.

In the optical fiber according to the present disclosure, the rough surface portion is preferably a frosted portion formed by frosting.

Effects of Invention

According to the present invention, the optical fiber capable of laterally emitting sufficient light can be provided.

BRIEF DESCRIPTION OF DRAWINGS

FIG. 3 is a graph partially showing a surface state of a core exposed portion exposed through a clad in an optical fiber according to a second embodiment.

FIG. 4 is a table showing results of a first verification experiment performed for verifying advantageous effects according to the embodiments.

FIG. 13 is a table showing results of the second verification experiment.

FIG. 18 is a table showing results of a third verification experiment performed for verifying the advantageous effects of the embodiments.

FIG. 19 is a table showing results of a fourth verification experiment performed for verifying the advantageous effects of the embodiments.

FIG. 22 is a table showing results of a fifth verification experiment performed for verifying the advantageous effects of the embodiments.

DESCRIPTION OF EMBODIMENTS

Figure 1:
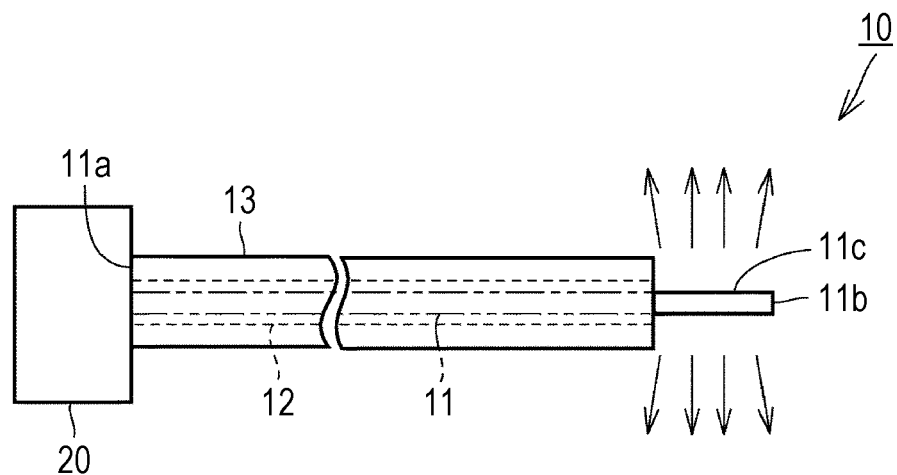
FIG. 1 is a schematic view showing an optical fiber according to a first embodiment.

Hereinafter, embodiments of the present invention will be described in detail with reference to the drawings. Note that in the embodiments below, the same reference numerals are used to represent the same or common elements. Moreover, description of these elements will not be repeated.

First Embodiment

FIG. 1 is a schematic view showing an optical fiber according to a first embodiment. The optical fiber 10 according to the first embodiment will be described with reference to FIG. 1.

The optical fiber 10 is, for example, used for a medical light guide such as an intraocular light guide. Note that the optical fiber 10 is not limited to a medical purpose and can be used as necessary for the purpose of laterally emitting light.

The optical fiber 10 transmits light emitted from a light source 20, and at a desired location, emits such light laterally to the optical fiber 10. In the first embodiment, the optical fiber 10 laterally emits transmitted light from a tip end side.

The optical fiber 10 includes a core 11, a clad 12, and a covering portion 13. The core 11 has a substantially circular columnar shape. The core 11 is made of glass.

The core 11 has one end 11a from which light enters and the other end 11b positioned on the opposite side of one end 11a. As described later, the core 11 has an exposed portion 11c exposed through the clad 12. The exposed portion 11c is provided on the other-end-11b side of the core 11.

A rough surface portion is entirely provided at an outer surface (an outer peripheral surface) of the exposed portion 11c. With such a rough surface portion, light can be effectively laterally emitted. Note that the rough surface portion may be provided at part of the outer peripheral surface of the exposed portion 11c as long as sufficient light can be laterally emitted.

The rough surface portion is a frosted portion formed by frosting. Note that details of frosting will be described in a later-described manufacturing method.

The clad 12 is arranged around the core 11 such that part of the core 11 is exposed. Specifically, the clad 12 is arranged around the core 11 such that a partial region of the surface of the core 11 along an axial direction thereof is exposed. More specifically, the clad 12 is arranged around the core 11 such that the core 11 is exposed on the tip end side of the optical fiber 10. The clad 12 may be made of glass. Alternatively, the clad 12 may be made of resin. Note that as described later, the exposed portion of the core 11 is formed in such a manner that part of the covering portion 13 and part of the clad 12 are removed from an optical fiber strand in this order. The optical fiber strand includes the clad 12 entirely surrounding the core 11 along the axial direction thereof and the covering portion 13 covering the clad 12.

The covering portion 13 covers the clad 12. The covering portion 13 is provided not to cover the exposed portion 11c of the core 11. The covering portion 13 is, for example, made of resin.

Figure 2:
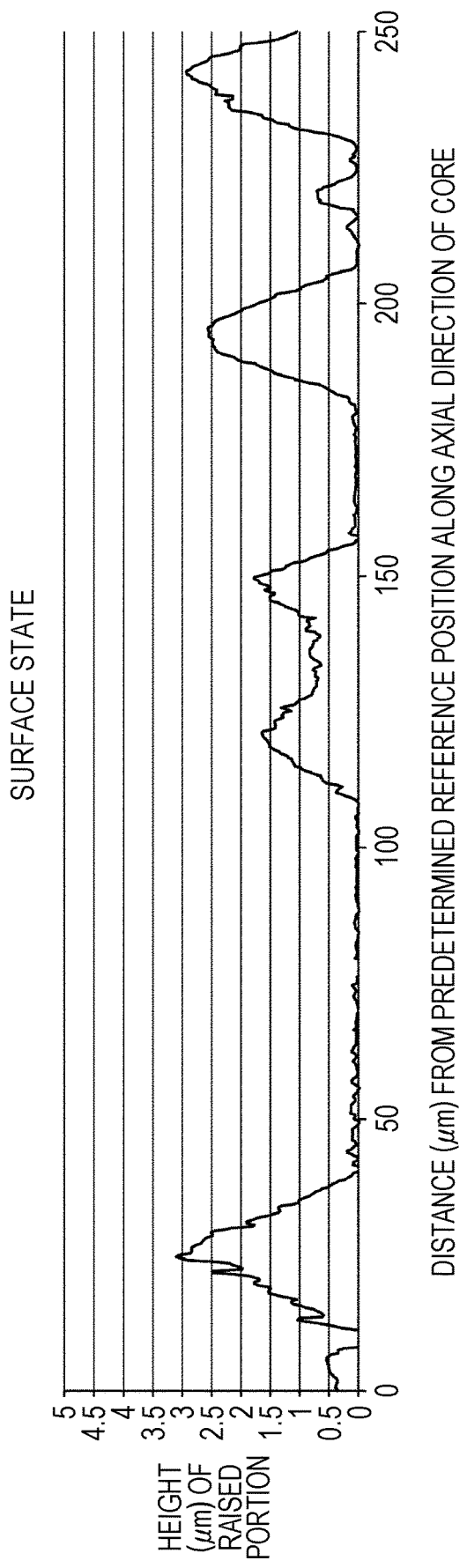
FIG. 2 is a graph partially showing a surface state of a core exposed portion exposed through a clad in the optical fiber according to the first embodiment.

FIG. 2 is a graph partially showing a surface state of the core exposed portion exposed through the clad in the optical fiber according to the first embodiment. The surface state of the exposed portion 11c will be described with reference to FIG. 2.

As shown in FIG. 2, raised portions protruding from the outer surface of the exposed portion 11c to the outside are formed at the rough surface portion. The raised portions are apart from each other with a certain degree of clearance. Some of the raised portions may be provided adjacent to each other.

Note that FIG. 2 shows, for the sake of convenience, the surface shape of a partial region, i.e., the surface shape of a region of the outer surface of the exposed portion 11c from a predetermined reference point to about 250 μm along the axial direction of the core 11. Substantially similarly, the raised portions are also provided across the entire region of the exposed portion 11c.

The arithmetic surface roughness Ra of the rough surface portion is equal to or greater than 0.2 μm. Further, the average length Rsm of a rough curve element of the rough surface portion is equal to or greater than 17 μm.

As indicated by the above-described values, the raised portions with a predetermined height or greater are provided apart from each other to a certain extent. Thus, sufficient light can be guided laterally to the core 11.

Specifically, in the first embodiment, the arithmetic surface roughness Ra of the rough surface portion is equal to or greater than about 0.5 μm and equal to or less than about 0.85 μm. Note that the arithmetic surface roughness Ra of the rough surface portion may be equal to or less than 1.0 μm or equal to or less than 0.9 μm.

The average length Rsm of the rough curve element of the rough surface portion is equal to or greater than about 40 μm and equal to or less than about 60 μm. Note that the average length Rsm of the rough curve element may be equal to or less than 500 μm. In this case, a scattering effect is also obtained, and therefore, light can be guided laterally to the core 11.

As described above, only the raised portions are formed at the rough surface portion. These raised portions are formed concentrated unevenly on a lower side with respect to an average line. The skewness Rsk of the rough surface portion exceeds zero. Moreover, at the rough surface portion, the number of raised portions formed on one end (base) side is less than the number of raised portions formed on the other end (tip end) side. That is, the arithmetic surface roughness Ra of the rough surface portion on one end side is less than the arithmetic surface roughness Ra on the other end side.

(Method for Manufacturing Optical Fiber)

The method for manufacturing the optical fiber according to the first embodiment includes the step of preparing the optical fiber strand, the step of exposing a predetermined location of the core 11, and the step of forming the rough surface portion at the predetermined location of the core 11.

At the step of preparing the optical fiber strand, the optical fiber strand including the clad 12 entirely surrounding the core 11 and the covering portion 13 covering the clad 12 is prepared. For example, a SI-type multimode fiber can be prepared as the optical fiber strand. The core 11 is, for example, made of pure silica. A core diameter is, for example, about 600 μmφ. The numerical aperture (NA) of the core is 0.22. The clad 12 is, for example, made of pure silica. A clad diameter is, for example, about 660 μmφ. The covering portion 13 covering the clad 12 is, for example, made of acrylic resin. The diameter of the covering portion 13 is about 800 μmφ.

Subsequently, at the step of exposing the predetermined location of the core 11, part of the covering portion 13 is removed from the optical fiber strand. Thereafter, part of the clad 12 is removed. In this manner, the predetermined location of the core 11 is exposed. Part of the clad 12 is removed by, e.g., etching.

At the step of forming the rough surface portion at the predetermined location of the core 11, the predetermined location of the core 11 exposed through the clad 12 is dipped in frosting liquid. The predetermined location is a location to be the exposed portion 11c.

Note that at this step, at least a boundary portion between a location (the predetermined location) intended to be frosted and a location not intended to be frosted may be covered by a mask. The entirety of the location not intended to be frosted may be covered by the mask. Using the mask, adherence of the frosting liquid to the location of the core 11 not intended to be frosted can be reduced.

The mask is not necessarily used at the step of forming the rough surface portion at the predetermined location of the core 11. Specifically, in a case where the rough surface portion is formed across the entirety of the predetermined location, the covering portion 13 functions as a mask without the need for using the mask. Thus, etching of the core 11 positioned inside the covering portion 13 can be prevented.

A liquid prepared in a manner, in which a substance significantly lowering the solubility, such as silicofluoride-like corrosion product, is added to a hydrofluoric acid-based aqueous solution, may be used as the frosting liquid.

In the case of using the above-described frosting liquid, a dense reactive product starts partially covering the surface of the core 11 at such a stage that corrosion of the core 11 has progressed to a certain extent. Accordingly, the raised portions are formed at the outer surface of the core 11 at the predetermined location. In this manner, the frosted portion as the rough surface portion can be formed at the outer surface of the core 11 at the predetermined location.

The hydrofluoric acid-based aqueous solution is prepared in such a manner that hydrofluoric acid, sulfuric acid, ammonium fluoride, and water are mixed with each other. The content of hydrofluoric acid in the hydrofluoric acid-based aqueous solution is 0 to 30%. The content of sulfuric acid in the hydrofluoric acid-based aqueous solution is 0 to 16%. The content of ammonium fluoride in the hydrofluoric acid-based aqueous solution is 0 to 42%. The content of water in the hydrofluoric acid-based aqueous solution is 12% or greater. These proportions of hydrofluoric acid, sulfuric acid, ammonium fluoride, and water can be adjusted as necessary.

In the first embodiment, the frosting liquid is used, which is prepared in such a manner that the hydrofluoric acid-based aqueous solution and an additive are mixed at a mass ratio of 7:3. The tip end side of the core 11 is, for about 180 seconds, dipped in the frosting liquid having a temperature of 20° C. to 23° C. At this point, in advance of dipping of one end side (the base side) of the predetermined location, the other end side (the tip end side) is dipped in the frosting liquid. Thus, the number of raised portions formed on one end side (the base side) of the predetermined location is less than the number of raised portions formed on the other end side (the tip end side) of the predetermined location. Moreover, at the predetermined location, the arithmetic surface roughness Ra on one end side is less than the arithmetic surface roughness Ra on the other end side. Subsequently, the core 11 is taken out of the frosting liquid. Then, the portion dipped in the frosting liquid is washed with water.

The optical fiber 10 according to the first embodiment is manufactured through the above-described steps. As described above, in the optical fiber 10 according to the first embodiment, the rough surface portion is chemically formed without the need for performing, e.g., a sandblasting method. Thus, damage on the core 11 can be reduced. Consequently, deterioration of the strength of the core 11 can be reduced.

As described above, the arithmetic surface roughness Ra of the rough surface portion is equal to or greater than 0.2 μm. Further, the average length Rsm of the rough curve element of the rough surface portion is equal to or greater than 17 μm. Thus, the raised portions with the predetermined height or greater can be provided apart from each other to a certain extent. Consequently, sufficient light can be emitted laterally to the core 11.

Second Embodiment

FIG. 3 is a graph partially showing a surface state of a core exposed portion exposed through a clad in an optical fiber according to a second embodiment.

As shown in FIG. 3, the optical fiber according to the second embodiment is different from the optical fiber 10 according to the first embodiment in the surface state of the exposed portion 11c. Specifically, in the second embodiment, raised portions have a shorter height than those of the first embodiment. Thus, the surface state of the exposed portion 11c is slightly different.

In the second embodiment, the arithmetic surface roughness Ra of a rough surface portion is also equal to or greater than 0.2 μm. Further, the average length Rsm of a rough curve element of the rough surface portion is also equal to or greater than 17 μm.

Specifically, the arithmetic surface roughness Ra of the rough surface portion is equal to or greater than about 0.2 μm and equal to or less than about 0.4 μm. The average length Rsm of the rough curve element of the rough surface portion is equal to or greater than about 35 μm and equal to or less than about 50 μm. In this case, a scattering effect is also obtained. Thus, light can be guided laterally to a core 11.

At the rough surface portion, only the raised portions are formed concentrated unevenly on an upper side with respect to an average line. Moreover, the skewness Rsk of the rough surface portion exceeds zero.

Even with the above-described configuration, advantageous effects substantially similar to those of the optical fiber 10 according to the first embodiment are obtained by the optical fiber according to the second embodiment.

Note that the optical fiber according to the second embodiment can be also manufactured by the manufacturing method according to the first embodiment. In this case, frosting liquid prepared in such a manner that a hydrofluoric acid-based aqueous solution and an additive are mixed at a mass ratio of 6:4 is used as frosting liquid. In this case, at the step of forming the rough surface portion at a predetermined location of the core 11, the predetermined location of the core 11 is also dipped in the frosting liquid having a temperature of 20° C. to 23° C. for about 180 seconds.

Third Embodiment

An optical fiber according to a third embodiment is different from the optical fiber 10 according to the first embodiment in frosting liquid used at a manufacturing step, and therefore, is different in a surface state of an exposed portion 11c.

In this case, frosting liquid prepared in such a manner that a hydrofluoric acid-based aqueous solution and an additive are mixed at a mass ratio of 5.5:4.5 is used as frosting liquid, and at the step of forming a rough surface portion at a predetermined location of a core 11, the predetermined location of the core 11 is dipped in the frosting liquid having a temperature of 20° C. to 23° C. for about 180 seconds.

In the third embodiment, the arithmetic surface roughness Ra of the rough surface portion is equal to or greater than 0.2 μm. Further, the average length Rsm of a rough curve element of the rough surface portion is equal to or greater than 17 μm.

Specifically, the arithmetic surface roughness Ra of the rough surface portion is equal to or greater than about 0.2 μm and equal to or less than about 0.35 μm. The average length Rsm of the rough curve element of the rough surface portion is equal to or greater than about 17 μm and equal to or less than about 20 μm. In this case, a scattering effect is also obtained. Thus, light can be guided laterally to the core 11.

At the rough surface portion, only raised portions are formed concentrated unevenly on an upper side with respect to an average line. Moreover, the skewness Rsk of the rough surface portion exceeds zero.

Even with the above-described configuration, advantageous effects substantially similar to those of the optical fiber 10 according to the first embodiment are obtained by the optical fiber according to the third embodiment.

Fourth Embodiment

An optical fiber according to a fourth embodiment is different from the optical fiber 10 according to the first embodiment in a core diameter and frosting liquid used at a manufacturing step, and therefore is different in a surface state of an exposed portion 11c.

In this case, the core diameter is set to about 300 Frosting liquid prepared in such a manner that a hydrofluoric acid-based aqueous solution and an additive are mixed at a mass ratio of 4.9:5.1 is used as the frosting liquid, and at the step of forming a rough surface portion at a predetermined location of a core 11, the predetermined location of the core 11 is dipped in the frosting liquid having a temperature of 20° C. to 23° C. for about 180 seconds.

In the fourth embodiment, the arithmetic surface roughness Ra of the rough surface portion is equal to or greater than 0.2 Further, the average length Rsm of a rough curve element of the rough surface portion is equal to or greater than 17 μm.

Specifically, the arithmetic surface roughness Ra of the rough surface portion is equal to or greater than about 0.3 μm and equal to or less than about 0.4 The average length Rsm of the rough curve element of the rough surface portion is equal to or greater than about 17 μm and equal to or less than about 20 μm. In this case, a scattering effect is also obtained. Thus, light can be guided laterally to the core 11.

At the rough surface portion, only raised portions are formed concentrated unevenly on an upper side with respect to an average line. Moreover, the skewness Rsk of the rough surface portion exceeds zero.

Even with the above-described configuration, advantageous effects substantially similar to those of the optical fiber 10 according to the first embodiment are obtained by the optical fiber according to the fourth embodiment.

(Verification Experiment)

FIG. 4 is a table showing results of a first verification experiment performed for verifying the advantageous effects according to the embodiments. The first verification experiment performed for verifying the advantageous effects according to the embodiments will be described with reference to FIG. 4.

In the first verification experiment, optical fibers according to a first example, a second example, a first comparative example, and a first reference example were prepared. Then, a surface state of an exposed portion 11c of each optical fiber was checked. Specifically, for a rough surface portion of each optical fiber, an arithmetic surface roughness Ra, the average length of a rough curve element, a ten-point average roughness Rzjis, a skewness Rsk, a kurtosis Rku, and the load length ratio Rmr (80%) of a rough curve were measured. Note that each of the above-described parameters is based on JIS B 0601-2013.

In measurement, a 3CCD real color confocal microscope "OPTELICS H1200" (manufactured by Lasertec Corporation) was used. In the first example, the second example, and the first reference example, each of the above-described parameters was measures three times at each of a one-end-side (base-side) location and the other-end-side (tip-end-side) location of the rough surface portion. In the first comparative example, each of the above-described parameters was measured twice at an optional position corresponding to the rough surface portion.

Upon measurement of a surface shape, an image of the exposed portion 11c was captured by the above-described microscope. Using the captured image, conversion into height information was performed. At this point, since the optical fiber is in a circular columnar shape, a change into the height information was performed after a curvature had been corrected. Note that a lens magnification was set to 50× for the above-described microscope. A resolution was set to 0.1 μm. Search Peak was used as a measurement algorithm. A Z-image channel was set to Green.

Im image processing was performed for analyzing the image to calculate each parameter based on the above-described JIS standard. At this point, a noise cut level was set to 2.0 μm. A filter size was set to 10 pixel. Median filter was performed. A filter size was set to 3. The number of times of repetition was set to once.

The optical fiber according to the first embodiment was used as the optical fiber according to the first example. The optical fiber according to the second embodiment was used as the optical fiber according to the second example. An optical fiber configured such that no rough surface portion is formed at a core 11 was used as the optical fiber according to the first comparative example. An optical fiber having a rough surface portion formed using frosting liquid with a different mass ratio of an additive and a hydrofluoric acid-based aqueous solution as compared to the first embodiment was used as the optical fiber according to the first reference example.

As the frosting liquid used upon preparation of the optical fiber according to the first reference example, frosting liquid prepared in such a manner that the hydrofluoric acid-based aqueous solution and the additive are mixed at a mass ratio of 1:9 was used. In this case, at the step of forming the rough surface portion at a predetermined location of a core 11, the predetermined location of the core 11 is also dipped in the frosting liquid having a temperature of 20° C. to 23° C. for about 180 seconds.

Figure 5:
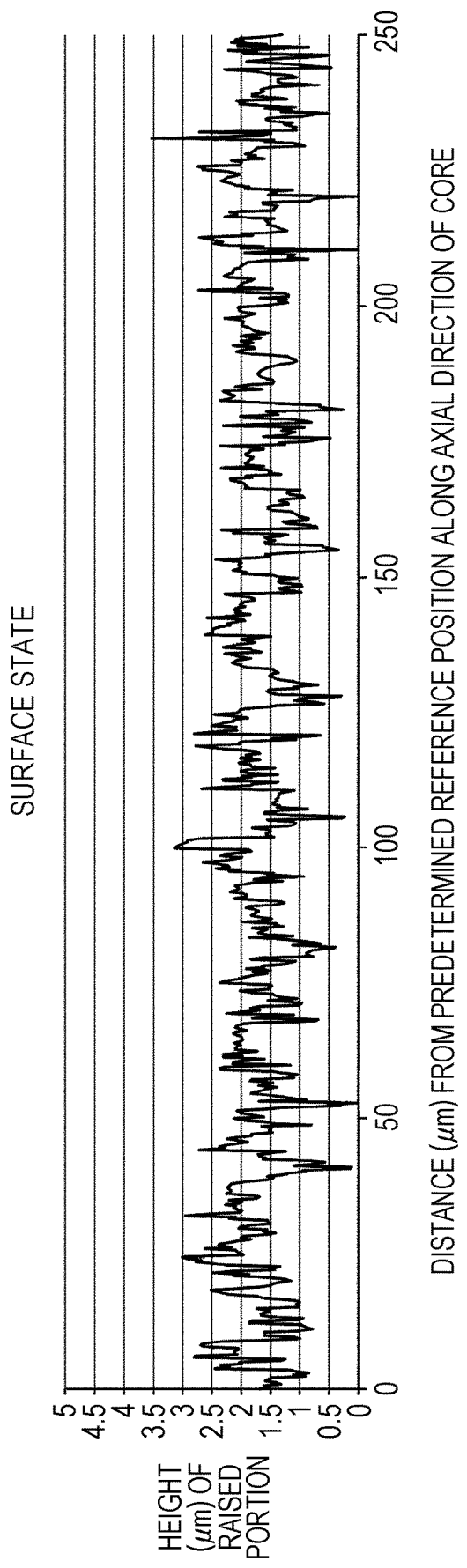
FIG. 5 is a graph partially showing a surface state of a core exposed portion exposed through a clad in an optical fiber according to a first reference example.

FIG. 5 is a graph partially showing the surface state of the core exposed portion exposed through a clad in the optical fiber according to the first reference example. As shown in FIG. 5, many raised portions are formed at the optical fiber according to the first reference example. That is, the raised portions are densely formed.

Figure 6:
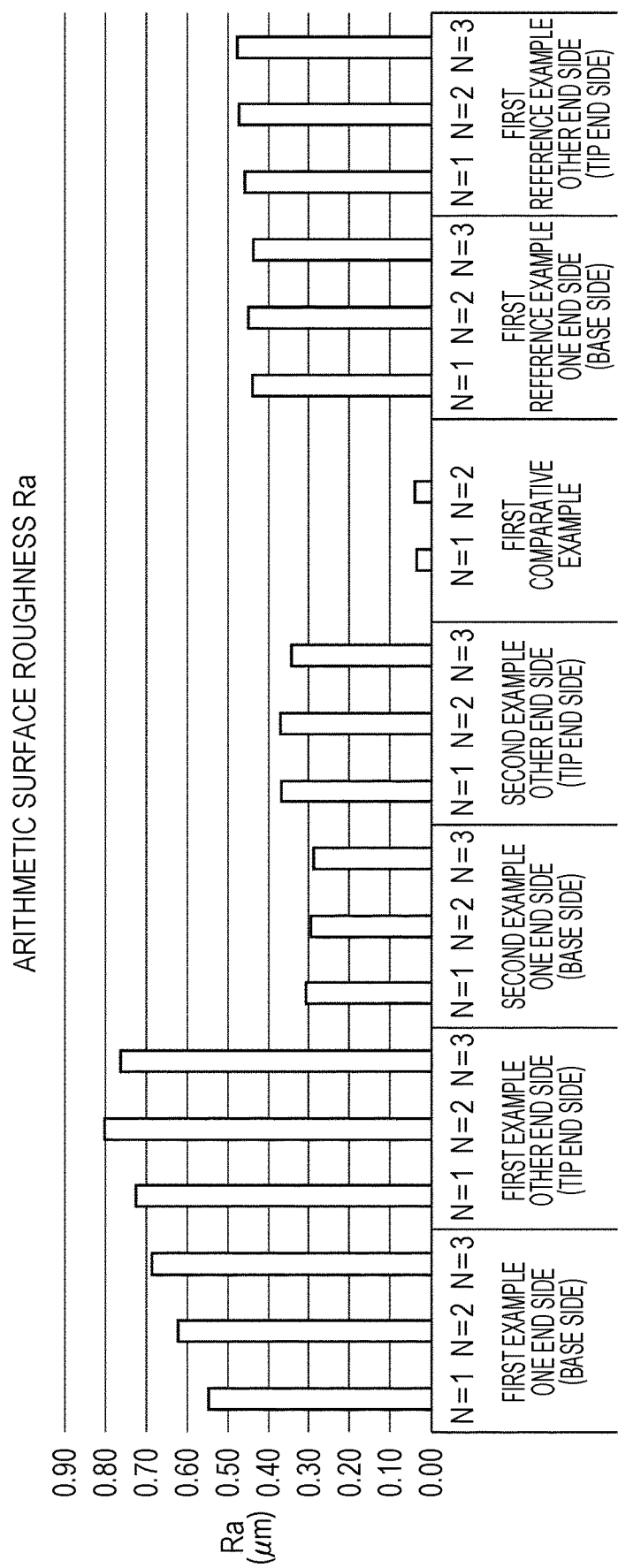
FIG. 6 is a graph showing an arithmetic surface roughness Ra among the experimental results shown in FIG. 4.

FIG. 6 is a graph showing the arithmetic surface roughness Ra among the experimental results shown in FIG. 4. As shown in FIGS. 4 and 6, in the first example, the arithmetic surface roughness Ra of the rough surface portion was equal to or greater than about 0.5 μm and equal to or less than about 0.85 μm. In the second example, the arithmetic surface roughness Ra of the rough surface portion was equal to or greater than about 0.2 μm and equal to or less than about 0.4 μm.

In the first comparative example, no rough surface portion is formed, but due to slight asperities, the arithmetic surface roughness Ra of the surface of the core 11 was equal to or greater than about 0 μm and equal to or less than about 0.1 μm. In the first reference example, the arithmetic surface roughness Ra of the rough surface portion was equal to or greater than about 0.4 μm and equal to or less than about 0.5 μm.

Figure 7:
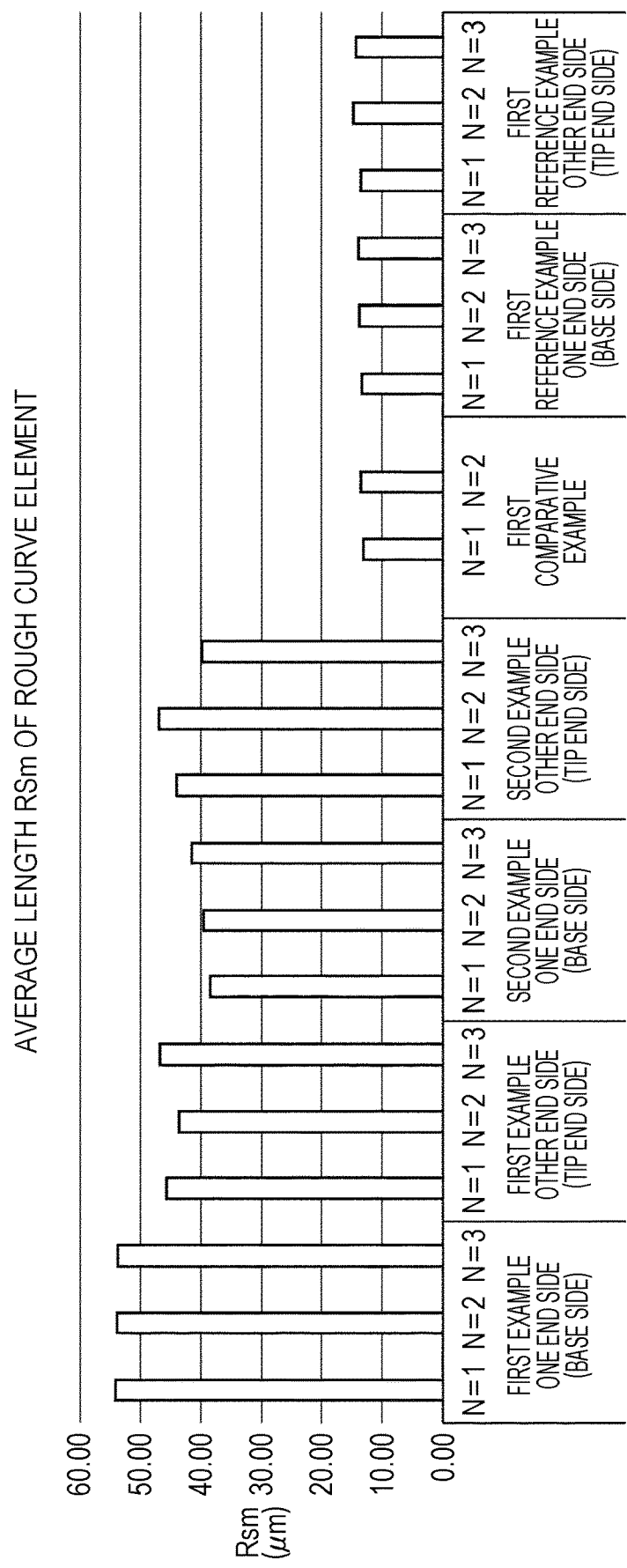
FIG. 7 is a graph showing the average length Rsm of a rough curve element among the experimental results shown in FIG. 4.

FIG. 7 is a graph showing the average length Rsm of the rough curve element among the experimental results shown in FIG. 4. As shown in FIGS. 4 and 7, in the first example, the average length Rsm of the rough curve element was equal to or greater than about 40 μm and equal to or less than about 60 μm. In the second example, the average length Rsm of the rough curve element was equal to or greater than about 35 μm and equal to or less than about 50 μm.

In the first comparative example, no rough surface portion is formed, but due to slight asperities, the average length Rsm of the rough curve element at the surface of the core 11 was equal to or greater than about 10 μm and less than about 15 μm. In the first reference example, the average length Rsm of the rough curve element of the rough surface portion was equal to or greater than about 10 μm and less than about 15 μm.

Figure 8:
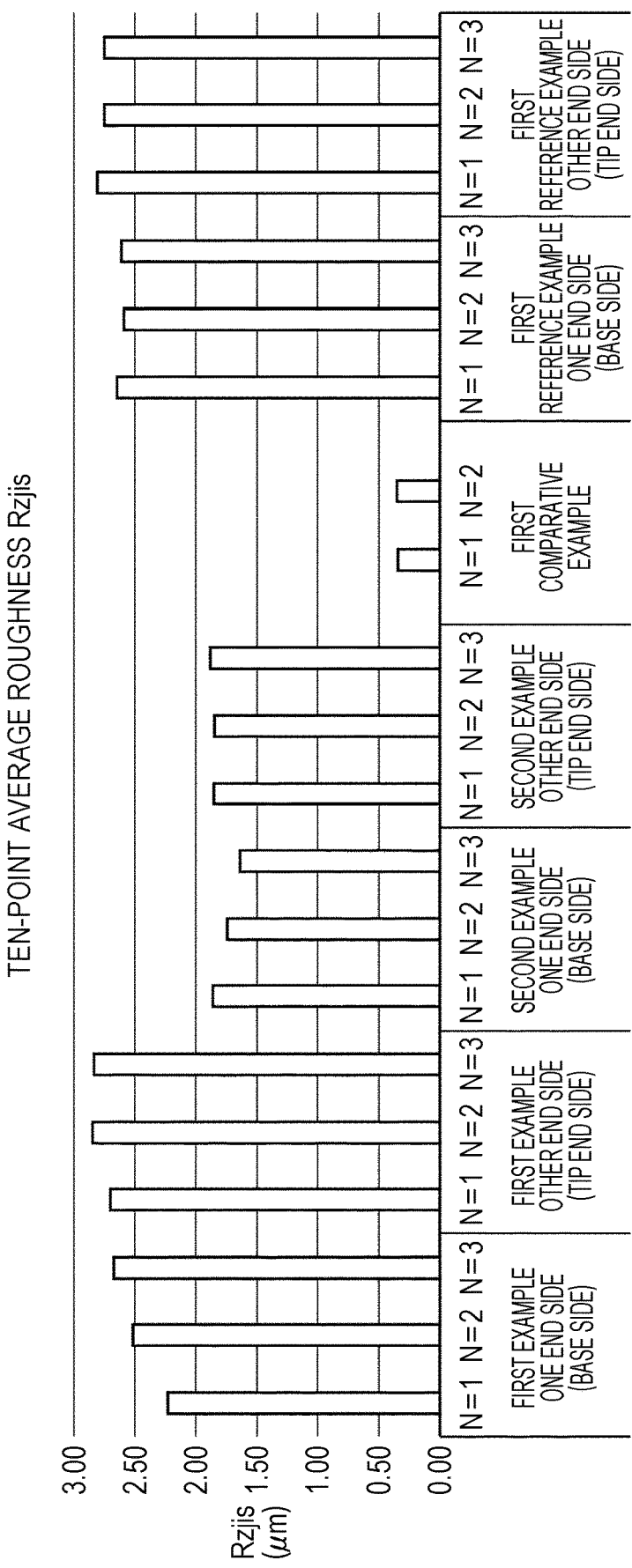
FIG. 8 is a graph showing a ten-point average roughness Rzjis among the experimental results shown in FIG. 4.

FIG. 8 is a graph showing the ten-point average roughness Rzjis among the experimental results shown in FIG. 4. As shown in FIGS. 4 and 8, in the first example, the ten-point average roughness Rzjis of the rough surface portion was equal to or greater than about 2.0 μm and equal to or less than about 3.0 μm. In the second example, the ten-point average roughness Rzjis of the rough surface portion was equal to or greater than about 1.5 μm and equal to or less than about 2.0 μm.

In the first comparative example, no rough surface portion is formed, but due to slight asperities, the ten-point average roughness Rzjis of the surface of the core 11 was equal to or less than 0.4 μm. In the first reference example, the ten-point average roughness Rzjis of the rough surface portion was equal to or greater than about 2.0 μm and equal to or less than about 3.0 μm.

Figure 9:
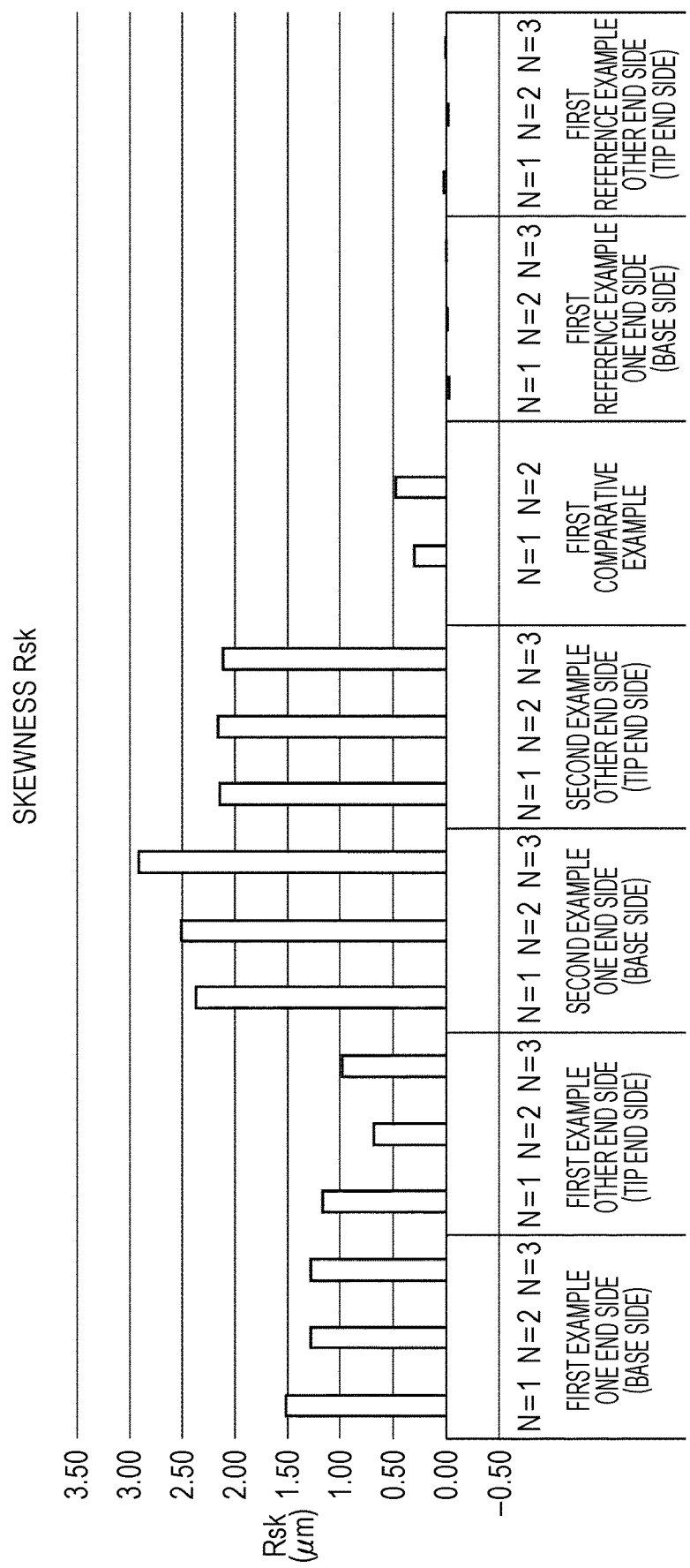
FIG. 9 is a graph showing a skewness Rsk among the experimental results shown in FIG. 4.

FIG. 9 is a graph showing the skewness Rsk among the experimental results shown in FIG. 4. As shown in FIGS. 4 and 9, in the first example, the skewness Rsk of the rough surface portion was greater than 0 and less than about 2.0. In the second example, the skewness Rsk of the rough surface portion was greater than 0 and less than about 3.0.

In the first comparative example, no rough surface portion is formed, but due to slight asperities, the skewness Rsk of the surface of the core 11 was greater than 0 and equal to or less than 0.5. In the first reference example, the skewness Rsk of the rough surface portion was substantially 0, but also includes a value of less than 0.

Figure 10:
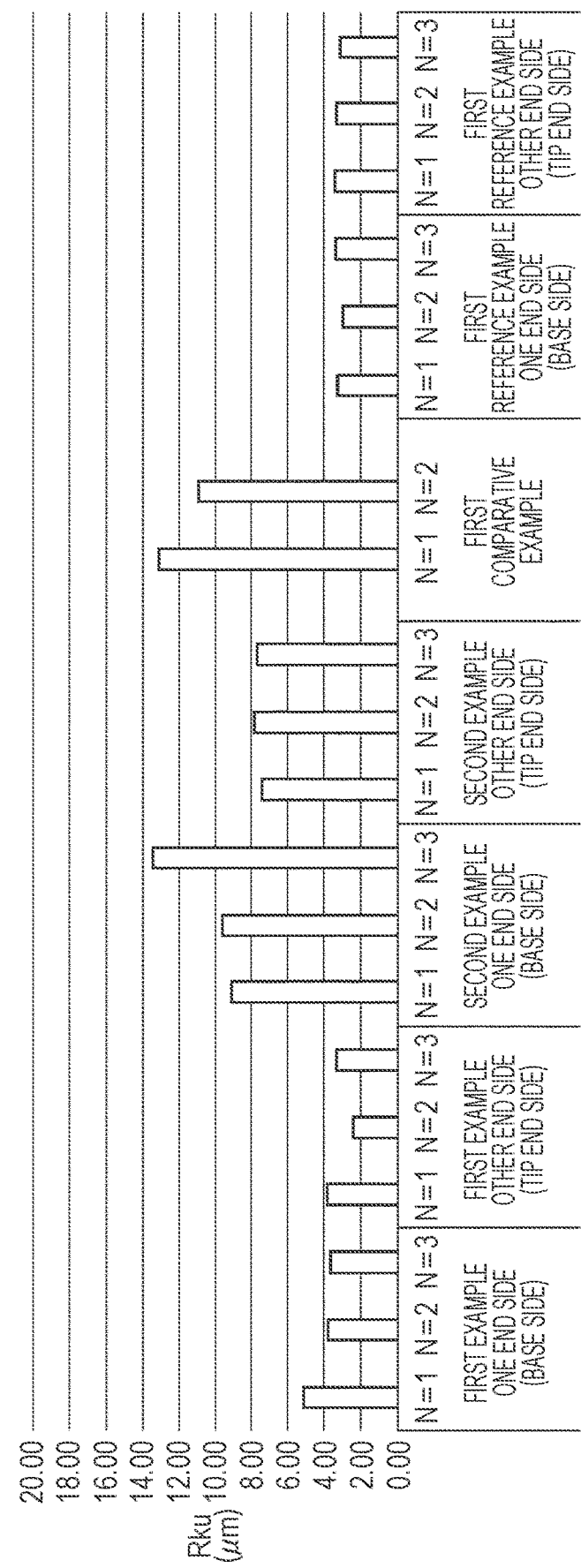
FIG. 10 is a graph showing a kurtosis Rku among the experimental results shown in FIG. 4.

FIG. 10 is a graph showing the kurtosis Rku among the experimental results shown in FIG. 4. As shown in FIGS. 4 and 10, in the first example, the kurtosis Rku of the rough surface portion was about 2.0 to about 6.0 or less. In the second example, the kurtosis Rku of the rough surface portion was about 7.0 to about 14.0 or less.

In the first comparative example, no rough surface portion is formed, but due to slight asperities, the kurtosis Rku of the surface of the core 11 was equal to or greater than about 10 and equal to or less than about 14. In the first reference example, the kurtosis Rku of the rough surface portion was equal to or greater than about 2.0 and equal to or less than about 4.0.

Figure 11:
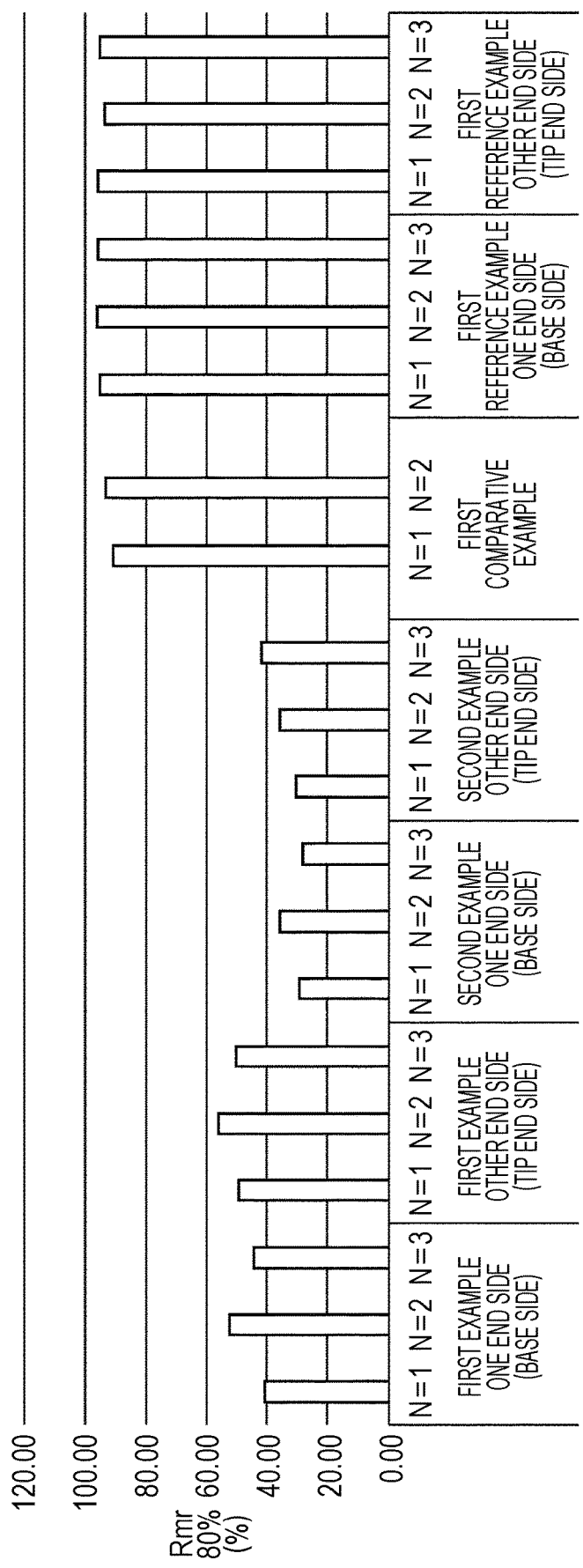
FIG. 11 is a graph showing the load length ratio Rmr (80%) of a rough curve among the experimental results shown in FIG. 4.

FIG. 11 is a graph showing the load length ratio Rmr (80%) of the rough curve among the experimental results shown in FIG. 4. As shown in FIGS. 4 and 11, in the first example, the load length ratio Rmr (80%) of the rough curve of the rough surface portion was equal to or greater than about 40% and equal to or less than about 60%. In the second example, the load length ratio Rmr (80%) of the rough curve of the rough surface portion was equal to or greater than about 25% and equal to or less than about 45%.

In the first comparative example, no rough surface portion is formed, but due to slight asperities, the load length ratio Rmr (80%) of the rough curve at the surface of the core 11 was equal to or greater than 90% and equal to or less than 100%. In the first reference example, the load length ratio Rmr (80%) of the rough curve of the rough surface portion was equal to or greater than 90% and equal to or less than 100%.

Figure 12:
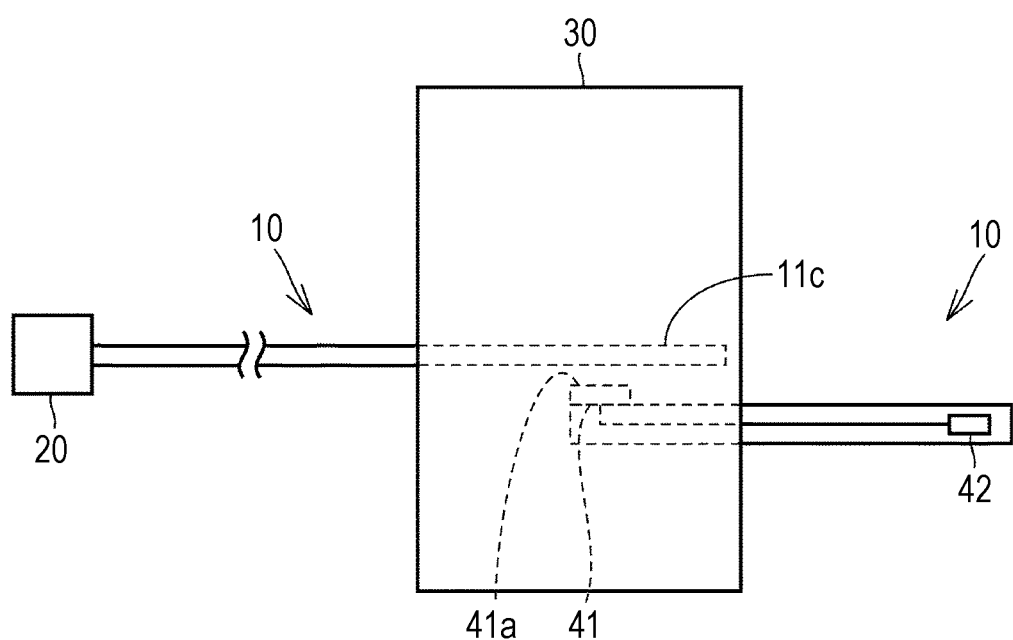
FIG. 12 is a view for describing a second verification experiment performed for verifying the advantageous effects of the embodiments.

FIG. 12 is a view for describing a second verification experiment performed for verifying the advantageous effects of the embodiments. FIG. 13 is a table showing results of the second verification experiment. The second verification experiment will be described with reference to FIGS. 12 and 13.

In the second verification experiment, the optical fibers according to the first example, the second example, the first comparative example, and the first reference example were prepared. The radiation flux of light emitted from each optical fiber was measured. Moreover, light emitted from the exposed portion 11c of each of the first example, the second example, and the first comparative example was checked.

In light measurement, light (tip end emitted light) emitted from a tip end and light (laterally-emitted light) emitted laterally were evaluated using Optical Power Meter 8230E (manufactured by ADC Corporation). Specifically, the radiation flux of light emitted forward from the tip end of the exposed portion 11c and the radiation flux of light emitted laterally from one end (base) side, the center side, and the other end (tip end) side of the exposed portion 11c were measured using a light measurement device 40.

At this point, the proportion of the tip end emitted light with respect to the output of the light source was, as evaluation of the tip end emitted light, calculated in the first comparative example, the first reference example, the first example, and the second example. Note that a variable output halogen lamp was used as the light source 20. An output value was changed according to environment at the day of implementation of measurement. Specifically, the output of the light source 20 was set to 275 µW in the first comparative example and the first reference example. The output of the light source 20 in the first example was set to 170 µW. The output of the light source 20 in the second example was set to 126 µW.

As evaluation of the laterally-emitted light, Radiation Flux of Laterally-Emitted Light/Radiation Flux of Tip End Emitted Light (%) was calculated for each of one end (base) side, the center side, and the other end (tip end) side of the exposed portion 11c. At this point, decimals are rounded to the nearest whole number.

Note that the light measurement device 40 includes a light receiving element 41 having a light receiving surface 41a and a radiation flux calculator 42 configured to calculate a radiation flux from light received by the light receiving element.

In the case of measuring the radiation flux of light emitted forward from the tip end of the exposed portion 11c, the light measurement device was set such that the light receiving surface 41a of the light receiving element 41 is perpendicular to the axial direction of the core 11. During measurement, the exposed portion 11c was covered by a cover 30. The light receiving element 41 was arranged at a position about 2 cm ahead of the tip end.

In the case of measuring the radiation flux of light emitted laterally to the core 11 from the exposed portion 11c of the core 11, the light measurement device was set such that the light receiving surface 41a of the light receiving element 41 is parallel with the axial direction of the core 11, as shown in FIG. 12. During measurement, the exposed portion 11c was covered by the cover 30. The light receiving element 41 was arranged at a position about 2 cm apart laterally from the exposed portion 11c.

As shown in FIG. 13, in the first comparative example, the radiation flux of light (the tip end emitted light) emitted from the tip end was 275 µW. The radiation flux of the laterally-emitted light was 4.2 µW on one end side of the rough surface portion, 3.6 µW on the center side of the rough surface portion, and 2.7 µW on the other end side of the rough surface portion. Further, Radiation Flux of Laterally-Emitted Light/Radiation Flux of Tip End Emitted Light was 2% on one end side of the rough surface portion, 1% on the center side of the rough surface portion, and 1% on the other end side of the rough surface portion. Thus, in the first comparative example, a slight amount of emission laterally to the core 11 was confirmed because no rough surface portion is formed at the surface of the core 11.

In the first reference example, the radiation flux of light (the tip end emitted light) emitted from the tip end was 122 µW. The proportion of the tip end emitted light as compared to the first comparative example was about 44%. That is, it was confirmed that light emitted laterally is about 56% of incident light from the light source.

The radiation flux of the laterally-emitted light was 19.5 µW on one end side of the rough surface portion, 5.1 µW on the center side of the rough surface portion, and 8.3 µW on the other end side of the rough surface portion. Further, Radiation Flux of Laterally-Emitted Light/Radiation Flux of Tip End Emitted Light was 16% on one end side of the rough surface portion, 4% on the center side of the rough surface portion, and 4% on the other end side of the rough surface portion.

As described above, in the first reference example, it was numerically confirmed that the rough surface portion is formed at the surface of the exposed portion 11c of the core 11 and light can be emitted laterally to the core 11 accordingly.

In the first example, the radiation flux of light (the tip end emitted light) emitted from the tip end was 40 µW. The proportion of the tip end emitted light as compared to the first comparative example was about 24%. That is, it was confirmed that light emitted laterally is about 76% of incident light from the light source.

The radiation flux of the laterally-emitted light was 17.0 µW on one end side of the rough surface portion, 16.4 µW on the center side of the rough surface portion, and 9.6 µW on the other end side of the rough surface portion. Further, Radiation Flux of Laterally-Emitted Light/Radiation Flux of Tip End Emitted Light was 42% on one end side of the rough surface portion, 41% on the center side of the rough surface portion, and 24% on the other end side of the rough surface portion.

As described above, in the first example, it was confirmed that the rough surface portion is formed at the surface of the exposed portion 11c of the core 11 and light can be emitted laterally to the core 11 accordingly. Moreover, in the first example, it was also confirmed that light emitted laterally increases in amount as compared to the first reference example.

In the second example, the radiation flux of light (the tip end emitted light) emitted from the tip end was 40 µW. The proportion of the tip end emitted light as compared to the first comparative example was about 36%. That is, it was confirmed that light emitted laterally is about 64% of incident light from the light source.

The radiation flux of the laterally-emitted light was 5.1 µW on one end side of the rough surface portion, 14.1 µW on the center side of the rough surface portion, and 3.2 µW on the other end side of the rough surface portion. Further, Radiation Flux of Laterally-Emitted Light/Radiation Flux of Tip End Emitted Light was 11% on one end side of the rough surface portion, 9% on the center side of the rough surface portion, and 7% on the other end side of the rough surface portion.

As described above, in the second example, it was confirmed that the rough surface portion is formed at the surface of the exposed portion 11c of the core 11 and light can be emitted laterally to the core 11 accordingly. Moreover, in the second example, it was also confirmed that the amount of light emitted laterally increases as compared to the first reference example.

As described above, comparison among the first reference example and the first and second examples shows that the amount of light emitted laterally is greater in the first and second examples. Thus, it was confirmed that the arithmetic surface roughness Ra of the rough surface portion is equal to or greater than 0.2 µm and the average length Rsm of the rough curve element of the rough surface portion is equal to or greater than 17 µm and sufficient light can be emitted laterally to the core 11 accordingly.

Figure 14:
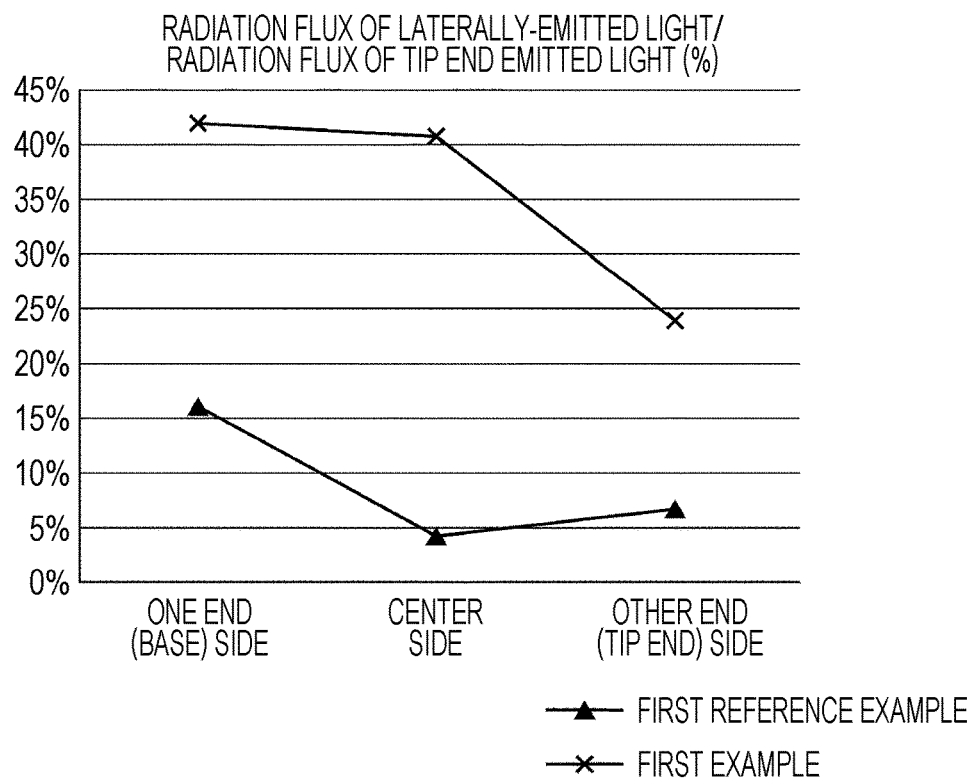
FIG. 14 is a graph of Radiation Flux of Laterally-Emitted Light/Radiation Flux of Tip End Emitted Light (%) of FIG. 13 compared between the first reference example and a first example.

FIG. 14 is a graph of Radiation Flux of Laterally-Emitted Light/Radiation Flux of Tip End Emitted Light (%) of FIG. 13 compared between the first reference example and the first example.

As shown in FIG. 14, comparison between the first reference example and the first example shows that Radiation Flux of Laterally-Emitted Light/Radiation Flux of Tip End Emitted Light (%) increases on any of the one end side, the center side, and the tip end side of the rough surface portion in the first example. Thus, it was also confirmed that the amount of light emitted laterally to the core 11 can be adjusted by adjustment of an asperity state of the rough surface portion.

Figure 15:
FIG. 15 is a view showing light emitted laterally from an exposed portion of an optical fiber according to the first reference example in the second verification experiment.
Figure 16:
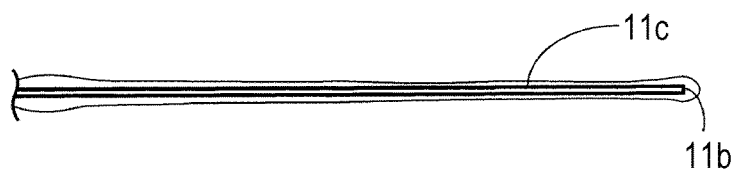
FIG. 16 is a view showing light emitted laterally from an exposed portion of an optical fiber according to the first example in the second verification experiment.
Figure 17:
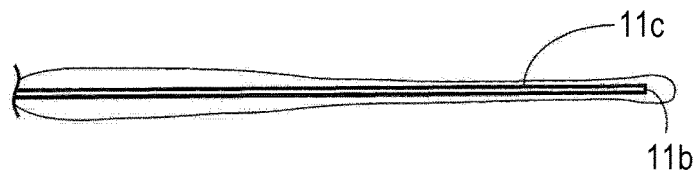
FIG. 17 is a view showing light emitted laterally from an exposed portion of an optical fiber according to a second example in the second verification experiment.

FIGS. 15 to 17 are views showing light emitted laterally from the exposed portion of the optical fiber according to each of the first reference example, the first example, and the second example in the second verification experiment. Note that FIGS. 15 and 17 indicate, by thin lines, the contour of light having a predetermined luminance. The roughened exposed portion 11c of the core is indicated by a thick line.

As shown in FIG. 15, light emitted from the exposed portion 11c of the optical fiber according to the first reference example was emitted laterally to the core 11.

As shown in FIG. 16, light emitted from the exposed portion 11c of the optical fiber according to the first example was also emitted laterally to the core 11. In the first example, the width of the light contour perpendicular to the axial direction of the core 11 increased. That is, it was confirmed that the amount of light emitted laterally to the core 11 increases as compared to the first reference example.

FIG. 17 is the view showing light emitted laterally from the exposed portion of the optical fiber according to the second example in the second verification experiment. As shown in FIG. 17, light emitted from the exposed portion 11c of the optical fiber according to the second example was also emitted laterally to the core 11. In the second example, the width of the light contour perpendicular to the axial direction of the core 11 also increased as compared to the first reference example. That is, it was confirmed that the amount of light emitted laterally to the core 11 increases as compared to the first reference example.

As described above, according to the first verification experiment and the second verification experiment, it was also confirmed that the arithmetic surface roughness Ra of the rough surface portion is equal to or greater than 0.2 µm and the average length Rsm of the rough curve element of the rough surface portion is equal to or greater than 17 µm and sufficient light can be emitted laterally to the core 11 accordingly.

FIG. 18 is a table showing results of a third verification experiment performed for verifying the advantageous effects of the embodiments. The third verification experiment performed for verifying the advantageous effects according to the embodiments will be described with reference to FIG. 18.

In the third verification experiment, optical fibers according to a third example and a fourth example were prepared. A surface state of an exposed portion 11c of each optical fiber was checked. Specifically, for a rough surface portion of each optical fiber, an arithmetic surface roughness Ra, the average length of a rough curve element, a ten-point average roughness Rzjis, a skewness Rsk, a kurtosis Rku, and the load length ratio Rmr (80%) of a rough curve were measured. Note that each of the above-described parameters is based on JIS B 0601-2013.

Note that each of the above-described parameters was measured by a method similar to that of the first verification experiment. In the third verification experiment, for both of the third example and the fourth example, each of a one-end-side (base-side) location, a center location, and the other-end-side (tip-end-side) location of the rough surface portion was measured three times. The average values of these values are shown in FIG. 18.

The optical fiber according to the third embodiment was used as the optical fiber according to the third example. The rough surface portion was formed in the same method as that of the first example, except that frosting liquid prepared in such a manner that a hydrofluoric acid-based aqueous solution and an additive are mixed at a mass ratio of 5.5:4.5 was used. In the third example, a core diameter was 600 µm.

The optical fiber according to the fourth embodiment was used as the optical fiber according to the fourth example. The rough surface portion was formed in the same method as that of the first example, except that frosting liquid prepared in such a manner that a hydrofluoric acid-based aqueous solution and an additive are mixed at a mass ratio of 4.9:5.1 was used. In the fourth example, a core diameter was 300 µm.

As shown in FIG. 18, in the third example, the arithmetic surface roughness Ra of the rough surface portion was equal to or greater than about 0.20 µm and equal to or less than about 0.35 µm. The skewness Rsk of the rough surface portion was greater than 0 and less than about 2.0. The kurtosis Rku of the rough surface portion was equal to or greater than about 2.5 and equal to or less than about 5.0. The average length Rsm of the rough curve element at the surface of the core 11 was equal to or greater than about 17 µm and equal to or less than about 20.0 µm. The load length ratio Rmr (80%) of the rough curve at the surface of the core 11 was 100%. The ten-point average roughness Rzjis of the rough surface portion was equal to or greater than about 0.5 µm and equal to or less than about 1.5 µm.

In the fourth example, the arithmetic surface roughness Ra of the rough surface portion was equal to or greater than about 0.30 µm and equal to or less than about 0.45 µm. The skewness Rsk of the rough surface portion was greater than 0 and less than about 1.0. The kurtosis Rku of the rough surface portion was equal to or greater than about 1.5 and equal to or less than about 2.5. The average length Rsm of the rough curve element at the surface of the core 11 was equal to or greater than about 17 µm and equal to or less than about 20.0 µm. The load length ratio Rmr (80%) of the rough curve at the surface of the core 11 was 100%. The ten-point average roughness Rzjis of the rough surface portion was equal to or greater than about 0.5 µm and equal to or less than about 1.5 µm.

FIG. 19 is a table showing results of a fourth verification experiment performed for verifying the advantageous effects of the embodiments. The fourth verification experiment performed for verifying the advantageous effects according to the embodiments will be described with reference to FIG. 19.

In the fourth verification experiment, the optical fibers according to the third example and a second comparative example were prepared. The radiation flux of light emitted from each optical fiber was measured. The radiation flux of light was measured in a manner substantially similar to that of the second verification experiment above.

As in the third verification experiment above, the optical fiber according to the third embodiment was used as the optical fiber according to the third example. An optical fiber having the same core diameter as that of the third example and formed with no rough surface portion at a core 11 was used as the optical fiber according to the second comparative example.

As in the second verification experiment, the proportion of the tip end emitted light with respect to the output of the light source was calculated for evaluating the tip end emitted light in the fourth verification experiment. In the third example and the second comparative example, the output of the light source was 412 µW.

As evaluation of the laterally-emitted light, Radiation Flux of Laterally-Emitted Light/Radiation Flux of Tip End Emitted Light (%) was calculated for each of one end (base) side, the center side, and the other end (tip end) side of the exposed portion 11c. At this point, decimals are rounded to the nearest whole number.

As shown in FIG. 19, in the second comparative example, the radiation flux of light (the tip end emitted light) emitted from the tip end was 412 µW. The proportion of the tip end emitted light as compared to the output of the light source was about 100%. Moreover, the radiation flux of the laterally-emitted light was 5.4 µW on one end side of the rough surface portion, 1.3 µW on the center side of the rough surface portion, and 2.6 µW on the other end side of the rough surface portion. Further, Radiation Flux of Laterally-Emitted Light/Radiation Flux of Tip End Emitted Light was 1% on one end side of the rough surface portion, 0% on the center side of the rough surface portion, and 1% on the other end side of the rough surface portion. Thus, in the second comparative example, a slight amount of emission laterally to the core 11 was confirmed because no rough surface portion is formed at the surface of the core 11.

On the other hand, in the third example, the radiation flux of light (the tip end emitted light) emitted from the tip end was 104 µW. The proportion of the tip end emitted light as compared to the output of the light source was about 25%. Moreover, the radiation flux of the laterally-emitted light was 27.7 µW on one end side of the rough surface portion, 29.0 µW on the center side of the rough surface portion, and 25.0 µW on the other end side of the rough surface portion. Further, Radiation Flux of Laterally-Emitted Light/Radiation Flux of Tip End Emitted Light was 27% on one end side of the rough surface portion, 28% on the center side of the rough surface portion, and 24% on the other end side of the rough surface portion.

Figure 20:
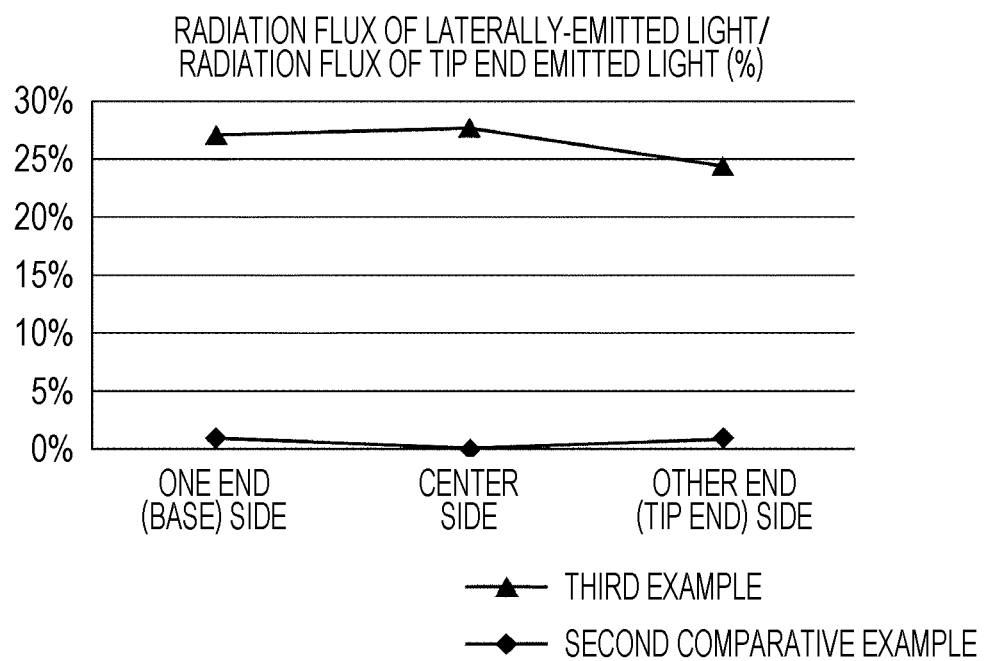
FIG. 20 is a graph of Radiation Flux of Laterally-Emitted Light/Radiation Flux of Tip End Emitted Light (%) of FIG. 19 compared between a second comparative example and a third example.

FIG. 20 is a graph of Radiation Flux of Laterally-Emitted Light/Radiation Flux of Tip End Emitted Light (%) of FIG. 19 compared between the second comparative example and the third example.

As shown in FIG. 20, comparison between the second comparative example and the third example shows that Radiation Flux of Laterally-Emitted Light/Radiation Flux of Tip End Emitted Light (%) increases on any of the one end side, the center side, and the tip end side of the rough surface portion in the third example. Moreover, the value of Radiation Flux of Laterally-Emitted Light/Radiation Flux of Tip End Emitted Light (%) is at the same level on any of the one end side, the center side, and the tip end side of the rough surface portion. That is, light was substantially uniformly emitted along a length direction.

Figure 21:
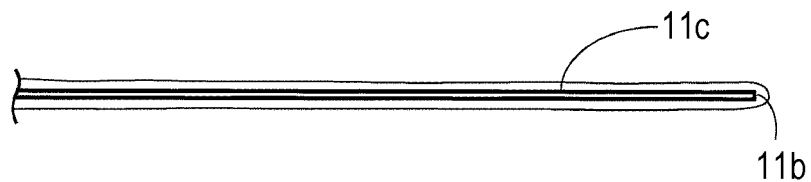
FIG. 21 is a view showing light emitted laterally from an exposed portion of an optical fiber according to the third example in the fourth verification experiment.

FIG. 21 is a view showing light emitted laterally from the exposed portion of the optical fiber according to the third example in the fourth verification experiment. As in FIGS. 15 to 17, an image of the optical fiber turned on in a dark place was captured. FIG. 21 indicates, by a thin line, the contour of light having a predetermined luminance. The roughened exposed portion 11c of the core is indicated by a thick line.

As shown in FIG. 21, light emitted from the exposed portion 11c of the optical fiber according to the third example was also emitted laterally to the core 11. Moreover, light was, around the core 11, substantially uniformly emitted laterally to the core 11 across the length direction of the optical fiber.

As described above, in the third example, it was confirmed that the rough surface portion is formed at the surface of the exposed portion 11c of the core 11 and light can be emitted laterally to the core 11 accordingly. Moreover, in the third example, it was also confirmed that light emitted laterally increases in amount as compared to the second comparative example.

As described above, as in the third example, it was also confirmed that the arithmetic surface roughness Ra of the rough surface portion is equal to or greater than 0.2 µm and the average length Rsm of the rough curve element of the rough surface portion is equal to or greater than 17 µm and sufficient light can be emitted laterally to the core 11 accordingly.

FIG. 22 is a table showing results of a fifth verification experiment performed for verifying the advantageous effects of the embodiments. The fifth verification experiment performed for verifying the advantageous effects according to the embodiments will be described with reference to FIG. 22.

In the fifth verification experiment, the optical fibers according to the fourth example and a third comparative example were prepared. The radiation flux of light emitted from each optical fiber was measured. The method for measuring the radiation flux of light and the method for evaluating the radiation flux of light are similar to those of the second verification experiment and the fourth verification experiment above. Thus, description thereof will be omitted.

The optical fiber according to the fourth embodiment was used as the optical fiber according to the fourth example. An optical fiber having the same core diameter as that of the fourth example was used as the optical fiber according to the third comparative example. Note that no rough surface portion was formed at a core 11. In the fourth example and the third comparative example, the output of the light source was 115 µW.

As shown in FIG. 22, in the third comparative example, the radiation flux of light (the tip end emitted light) emitted from the tip end was 115 µW. The proportion of the tip end emitted light as compared to the output of the light source was about 100%. Moreover, the radiation flux of the laterally-emitted light was 1.2 µW on one end side of the rough surface portion, 0.8 µW on the center side of the rough surface portion, and 1.4 µW on the other end side of the rough surface portion. Further, Radiation Flux of Laterally-Emitted Light/Radiation Flux of Tip End Emitted Light was 1% on one end side of the rough surface portion, 1% on the center side of the rough surface portion, and 1% on the other end side of the rough surface portion. Thus, in the third comparative example, a slight amount of emission laterally to the core 11 was confirmed because no rough surface portion is formed at the surface of the core 11.

On the other hand, in the fourth example, the radiation flux of light (the tip end emitted light) emitted from the tip end was 16 µW. The proportion of the tip end emitted light as compared to the output of the light source was about 14%. Moreover, the radiation flux of the laterally-emitted light was 24.0 µW on one end side of the rough surface portion, 11.0 µW on the center side of the rough surface portion, and 3.5 µW on the other end side of the rough surface portion. Further, Radiation Flux of Laterally-Emitted Light/Radiation Flux of Tip End Emitted Light was 150% on one end side of the rough surface portion, 69% on the center side of the rough surface portion, and 22% on the other end side of the rough surface portion.

Figure 23:
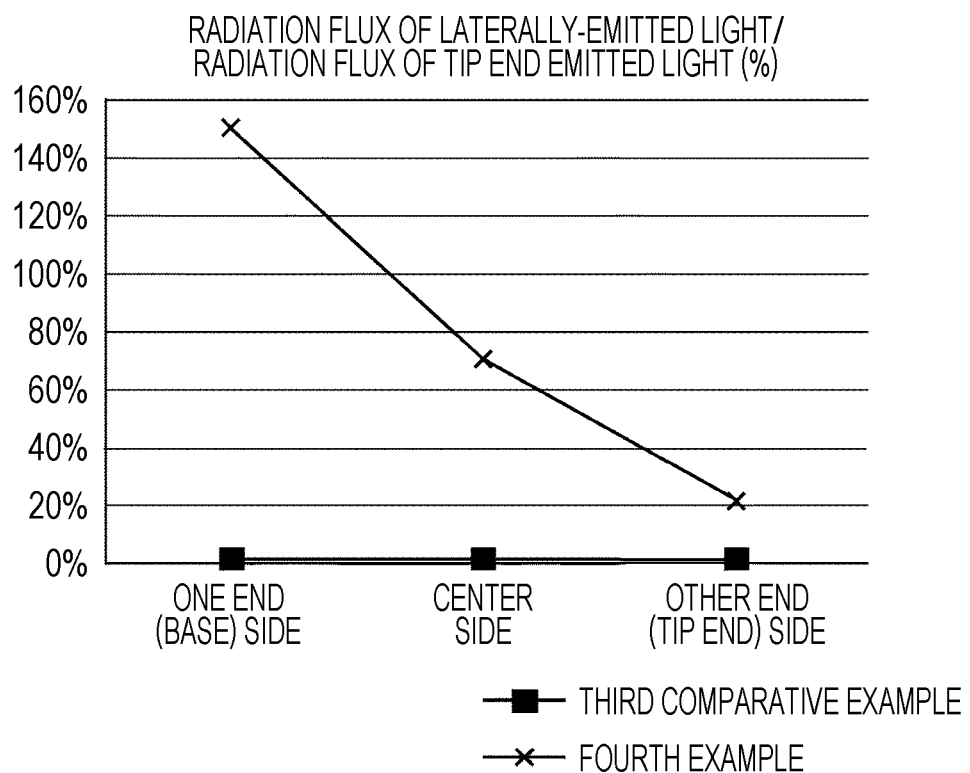
FIG. 23 is a graph of Radiation Flux of Laterally-Emitted Light/Radiation Flux of Tip End Emitted Light (%) of FIG. 22 compared between a third comparative example and a fourth example.

FIG. 23 is a graph of Radiation Flux of Laterally-Emitted Light/Radiation Flux of Tip End Emitted Light (%) of FIG. 22 compared between the third comparative example and the fourth example. Comparison between the third comparative example and the fourth example shows that Radiation Flux of Laterally-Emitted Light/Radiation Flux of Tip End Emitted Light (%) increases on any of the one end side, the center side, and the tip end side of the rough surface portion in the fourth example.

Figure 24:
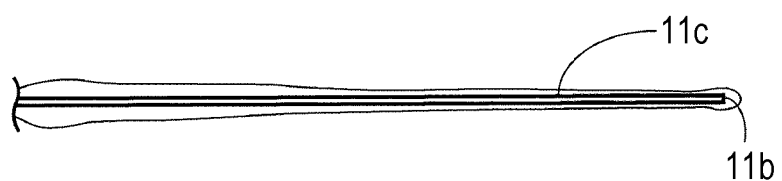
FIG. 24 is a view showing light emitted laterally from the exposed portion of the optical fiber according to the fourth example in the fifth verification experiment.

FIG. 24 is a view showing light emitted laterally from the exposed portion of the optical fiber according to the fourth example in the fifth verification experiment. As in FIGS. 15 to 17 and FIG. 21, an image of the optical fiber turned on in a dark place was captured. FIG. 24 also indicates, by a thin line, the contour of light having a predetermined luminance. The roughened exposed portion 11c of the core is indicated by a thick line.

As shown in FIG. 24, light emitted from the exposed portion 11c of the optical fiber according to the fourth example was also emitted laterally to the core 11. Moreover, it was also confirmed that more light is emitted on the base side.

As described above, in the fourth example, it was confirmed that the rough surface portion is formed at the surface of the exposed portion 11c of the core 11 and light can be emitted laterally to the core 11 accordingly. Moreover, in the fourth example, it was also confirmed that light emitted laterally increases in amount as compared to the third comparative example.

As described above, as in the fourth example, it was confirmed that the arithmetic surface roughness Ra of the rough surface portion is equal to or greater than 0.2 µm and the average length Rsm of the rough curve element of the rough surface portion is equal to or greater than 17 µm and sufficient light can be emitted laterally to the core 11 accordingly.

Figure 25:
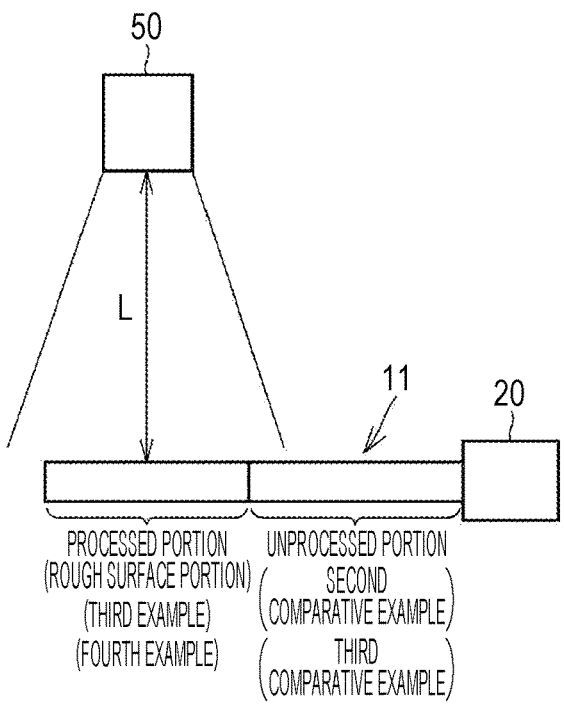
FIG. 25 is a view for describing a sixth verification experiment performed for verifying the advantageous effects of the embodiments.

FIG. 25 is a view for describing a sixth verification experiment performed for verifying the advantageous effects of the embodiments. The sixth verification experiment will be described with reference to FIG. 25.

In the sixth verification experiment, the tip end side of the core 11 was processed using frosting liquid. Further, a core was used, which includes a processed portion having a rough surface portion formed by the above-described processing and a non-roughened unprocessed portion on the base side of the core 11. Light was input to the base of the core 11 from the light source 20. The intensity of light emitted laterally from each of the processed portion and the unprocessed portion was measured. Note that in FIG. 25, a fiber, a connector and the like used for inputting light emitted from the light source 20 to the base side of the core 11 are not shown for the sake of convenience.

A light source configured to emit light with a wavelength of 660 nm was used as the light source 20. The output of the light source 20 was 15 mW.

Two cores 11 having core diameters of 600 µm and 300 µm were prepared as the core. The processed portion and the unprocessed portion are formed at each of these cores.

The tip end side of the core 11 with a core diameter of 600 µm was frosted under the same conditions as those of the third example (the third embodiment). Thus, the processed portion of the core 11 was used in the third example. The unprocessed portion of the core 11 was used in the second comparative example.

The tip end side of the core 11 with a core diameter of 300 µm was frosted under the same conditions as those of the fourth example (the fourth embodiment). Thus, the processed portion of the core 11 was used in the fourth example. The unprocessed portion of the core 11 was used in the third comparative example.

In measurement of the light intensity, an image capturing device 50 was arranged at the side of the core 11. In a state in which light is input to the core 11, an image of the core 11 was captured. By analysis of the captured image, the intensity (Intensity) of light emitted laterally from each of the processed portion and the unprocessed portion was calculated from luminance distribution. Note that Intensity is a relative intensity for comparing the intensities of light emitted laterally from the processed portion and the unprocessed portion. As described later, the intensity of light emitted laterally from a center portion of the unprocessed portion was set to 15 as a reference value.

Note that the image capturing device 50 was arranged such that a distance L from the core 11 is 315 mm. The focal length of the image capturing device 50 was 16 mm. An aperture value was 5.6. When the image was captured by the image capturing device 50, the image of the core 11 was captured such that the entirety of the unprocessed portion in the length direction or the entirety of the processed portion in the length direction is on the image.

Figure 26:
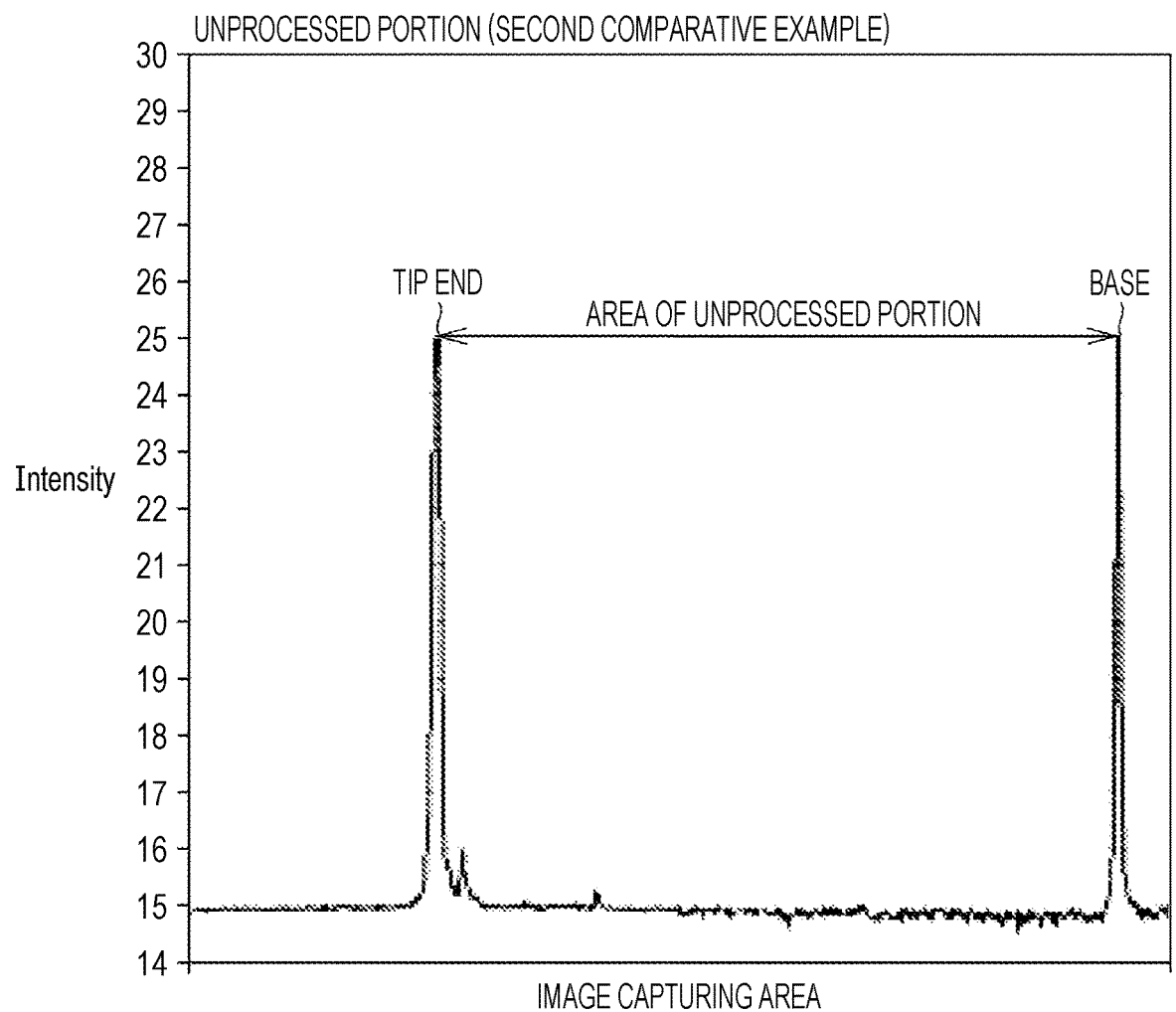
FIG. 26 is a graph showing distribution of light emitted laterally from an unprocessed portion of a core of the second comparative example in the sixth verification experiment.

FIG. 26 is a graph showing distribution of light emitted laterally from the unprocessed portion of the core of the second comparative example in the sixth verification experiment.

As shown in FIG. 26, at the unprocessed portion of the core of the second comparative example, Intensity is high at a base position and a tip end position due to leakage of light to the lateral side. However, Intensity was 15 between the base position and the tip end position.

Figure 27:
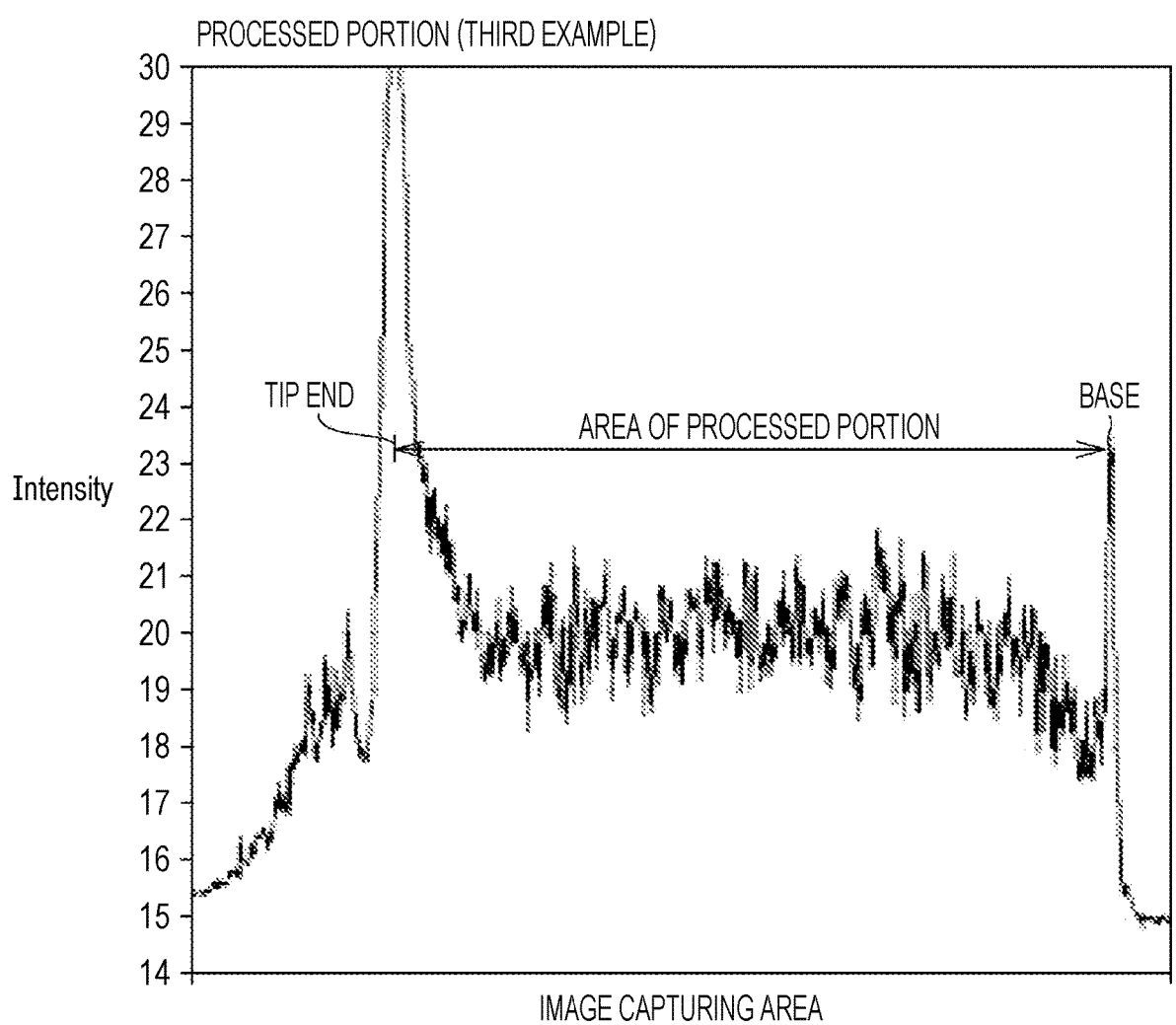
FIG. 27 is a graph showing, in the sixth verification experiment, distribution of light emitted laterally from a processed portion of a core roughened under the same conditions as those of the third example.

FIG. 27 is a graph showing, in the sixth verification experiment, distribution of light emitted laterally from the processed portion of the core roughened under the same conditions as those of the third example.

As shown in FIG. 27, at the processed portion of the core roughened under the same conditions as those of the third example, Intensity was high at the base position due to leakage of light to the lateral side. At the tip end position, Intensity was high due to emission of light from the tip end. Moreover, between the base position and the tip end position, Intensity increased as compared to the unprocessed portion of the second comparative example shown in FIG. 26, and was about 20.

As described above, comparison among the results of FIG. 26 and the results of FIG. 27 shows that as in the third example, the arithmetic surface roughness Ra of the rough surface portion is equal to or greater than 0.2 µm and the average length Rsm of the rough curve element of the rough surface portion is equal to or greater than 17 µm and sufficient light can be emitted laterally to the core 11 accordingly.

Figure 28:
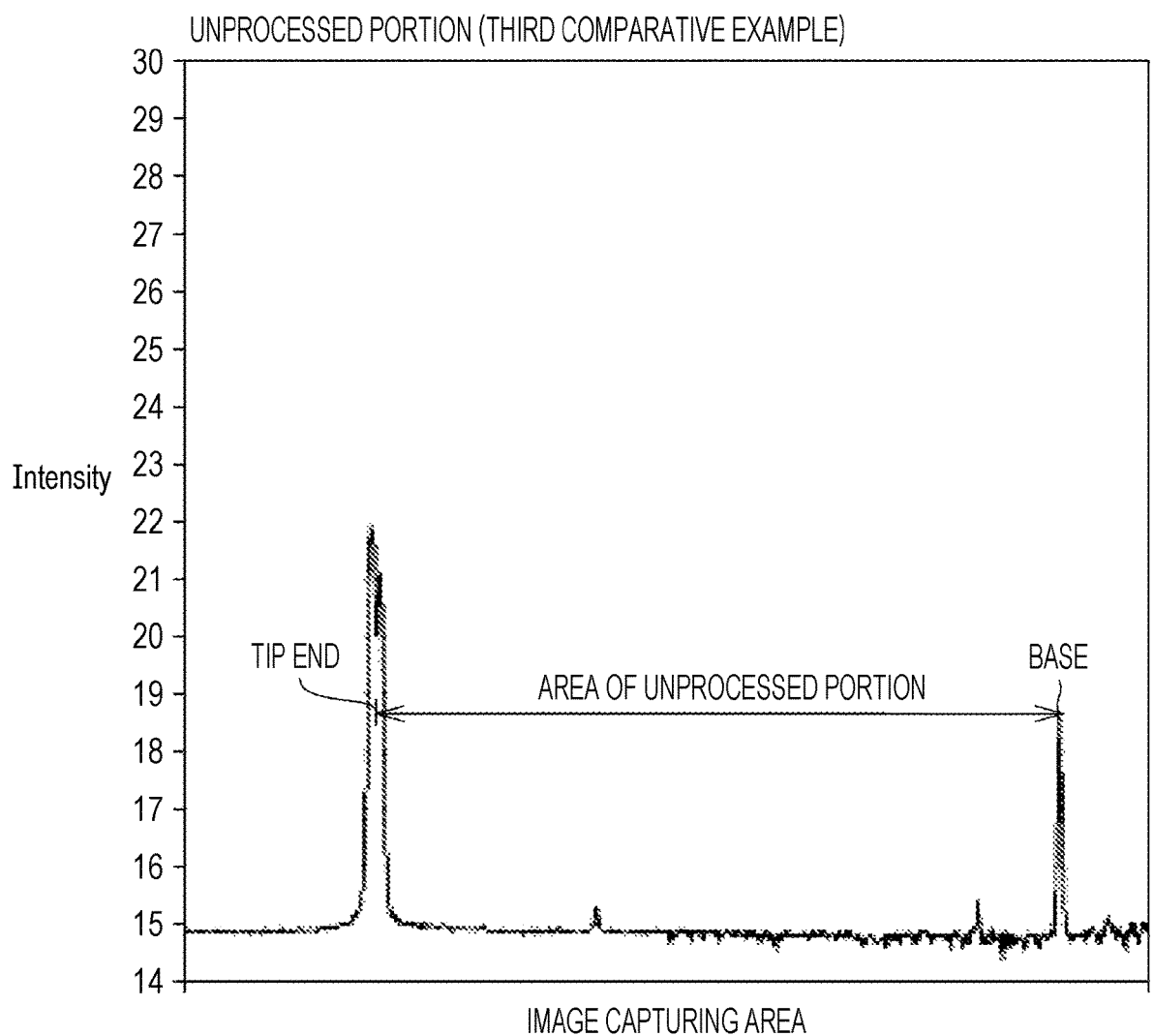
FIG. 28 is a graph showing distribution of light emitted laterally from an unprocessed portion of a core of the third comparative example in the sixth verification experiment.

FIG. 28 is a graph showing distribution of light emitted laterally from the unprocessed portion of the core of the second comparative example in the sixth verification experiment.

As shown in FIG. 28, at the unprocessed portion of the core of the second comparative example, Intensity is high at the base position and the tip end position due to leakage of light to the lateral side. However, Intensity was substantially constant between the base position and the tip end position, and was about 15.

Figure 29:
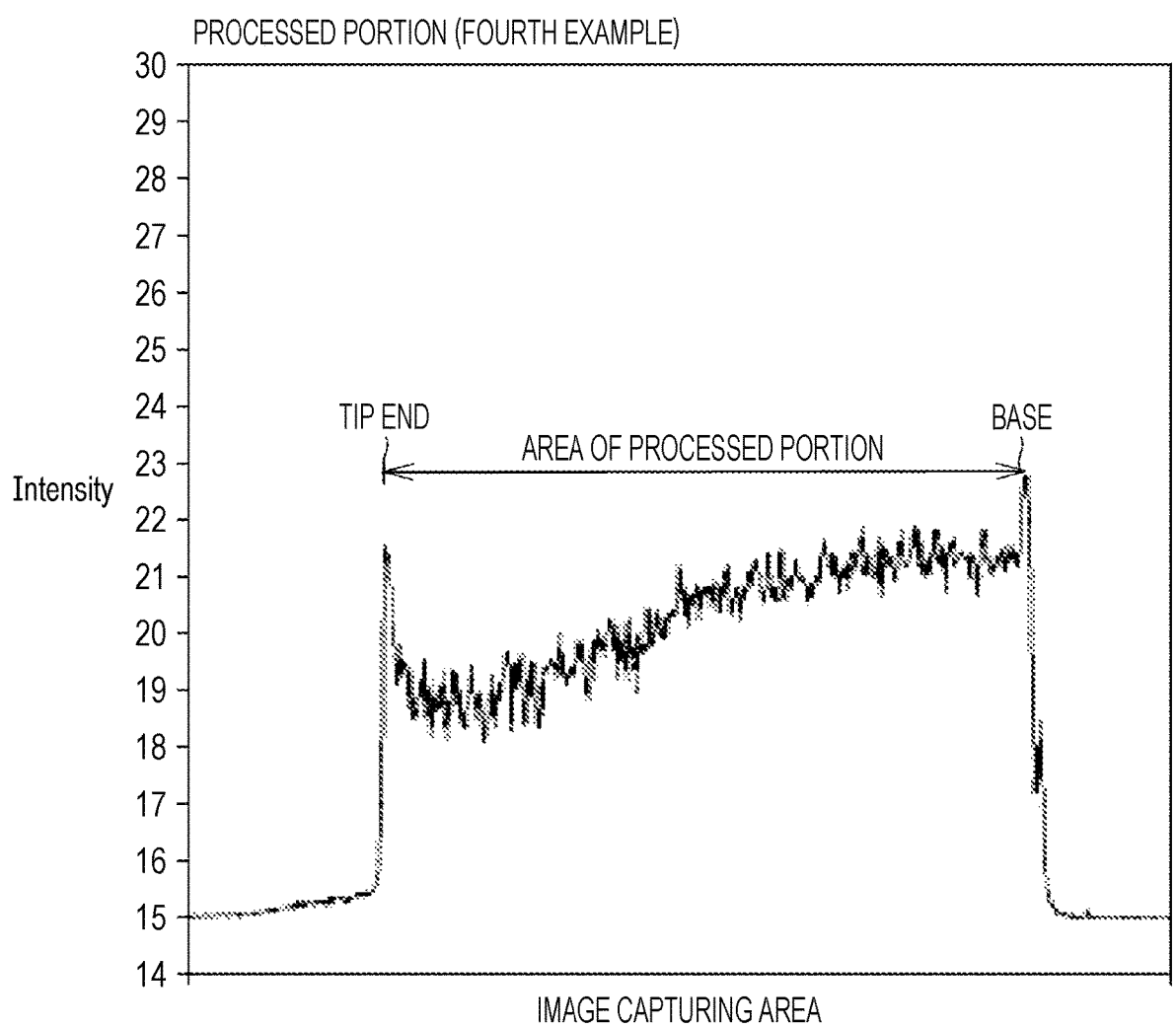
FIG. 29 is a graph showing, in the sixth verification experiment, distribution of light emitted laterally from a processed portion of a core roughened under the same conditions as those of the fourth example.

FIG. 29 is a graph showing, in the sixth verification experiment, distribution of light emitted laterally from the processed portion of the core roughened under the same conditions as those of the fourth example.

As shown in FIG. 29, at the processed portion of the core roughened under the same conditions as those of the fourth example, Intensity was high at the base position due to leakage of light to the lateral side. At the tip end position, Intensity was high due to emission of light from the tip end. Moreover, between the base position and the tip end position, Intensity increased as compared to the unprocessed portion of the second comparative example shown in FIG. 28, and was equal to or greater than 18 and equal to or less than 22. In this case, Intensity on the tip end side of the processed portion was about 19. Intensity on the base side of the processed portion was about 21. As described above, Intensity on the base side was higher.

As described above, comparison among the results of FIG. 28 and the results of FIG. 29 shows that as in the fourth example, the arithmetic surface roughness Ra of the rough surface portion is equal to or greater than 0.2 µm and the average length Rsm of the rough curve element of the rough surface portion is equal to or greater than 17 µm and sufficient light can be emitted laterally to the core 11 accordingly.

Other Variations

As description of the method for manufacturing the optical fibers of the first and second embodiments, the case where the clad 12 is removed at the predetermined location of the core 11 surrounded by the clad 12 after part of the covering portion 13 has been removed and the rough surface portion is subsequently formed at the portion of the core 11 exposed through the clad 12 has been described as an example. Note that the method for manufacturing the optical fiber is not limited to above. As the method for manufacturing the optical fiber, the clad 12 may be formed around the core 11 such that the rough surface portion is exposed after the rough surface portion has been formed at the predetermined location of the core 11. When the clad 12 is formed, the surface of the core 11 is coated by optical polymer such that the rough surface portion is exposed, for example. Subsequently, the clad 12 is coated by resin to be the covering portion 13. The same also applies to the third and fourth embodiments.

As description of the first and second embodiments, the case where the arithmetic surface roughness Ra on one end side is, at the rough surface portion, less than the arithmetic surface roughness Ra on the other end side has been described as an example. Note that the arithmetic surface roughness Ra of the rough surface portion is not limited to above. For example, the rough surface portion may be formed such that the arithmetic surface roughness Ra is substantially constant from one end side to the other end side at the rough surface portion. The same also applies to the third and fourth embodiments.

The embodiments of the present invention as described above are examples on all points. These aspects are not intended to limit the range of the present invention. The range of the present invention is defined by the appended claims. All variations and equivalents which fall within the range of the appended claims are intended to be embraced therein.

LIST OF REFERENCE SIGNS

10 Optical Fiber
11 Core
11a One End
11b Other End
11c Exposed Portion
12 Clad
13 Covering Portion
20 Light Source
30 Cover
40 Light Measurement Device
41 Light Receiving Element
41a Light Receiving Surface
42 Radiation Flux Calculator

The invention claimed is:

1. An optical fiber comprising:
a core; and
a clad arranged around the core such that part of the core is exposed,
wherein a rough surface portion is provided at least at part of an outer surface of the core exposed portion exposed through the clad,
an arithmetic surface roughness Ra, according to JIS B 0601-2013, of the rough surface portion is equal to or greater than 0.2 µm, and
an average length Rsm, according to JIS B 0601-2013, of a rough curve element of the rough surface portion is equal to or greater than 17 µm.

2. The optical fiber according to claim 1, wherein raised portions protruding from the outer surface of the exposed portion to an outside are formed at the rough surface portion.

3. The optical fiber according to claim 1, wherein a skewness Rsk, according to JIS B 0601-2013, of the rough surface portion is greater than 0.

4. The optical fiber according to claim 1, wherein the core includes one end into which light enters from a light source and the other end positioned on an opposite side of the one end, and
at the rough surface portion, an arithmetic surface roughness Ra, according to JIS B 0601-2013, on the one end side is less than an arithmetic surface roughness Ra, according to JIS B 0601-2013, on the other end side.

5. The optical fiber according to claim 1, wherein the core includes the one end into which the light enters from the light source and the other end positioned on the opposite side of the one end, and the exposed portion is provided on the other end side of the core.

6. The optical fiber according to claim 1, wherein the rough surface portion is a frosted portion formed by frosting.

* * * * *